United States Patent
Chai et al.

(10) Patent No.: US 11,968,677 B2
(45) Date of Patent: Apr. 23, 2024

(54) METHOD FOR DETERMINING RESOURCE OF ASYNCHRONOUS PHYSICAL UPLINK SHARED CHANNEL AND DEVICE

(71) Applicant: HUAWEI TECHNOLOGIES CO., LTD., Guangdong (CN)

(72) Inventors: Xiaomeng Chai, Shanghai (CN); Yiqun Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 17/535,663

(22) Filed: Nov. 25, 2021

(65) Prior Publication Data

US 2022/0086827 A1 Mar. 17, 2022

Related U.S. Application Data

(63) Continuation of application No. PCT/CN2020/093536, filed on May 29, 2020.

(30) Foreign Application Priority Data

May 30, 2019 (CN) .......................... 201910465097.6

(51) Int. Cl.
  *H04W 72/04* (2023.01)
  *H04L 5/00* (2006.01)
  (Continued)

(52) U.S. Cl.
  CPC .......... *H04W 72/21* (2023.01); *H04L 5/0012* (2013.01); *H04W 72/0446* (2013.01); *H04W 72/0453* (2013.01); *H04W 74/0833* (2013.01)

(58) Field of Classification Search
  CPC ............... H04L 5/0044; H04L 5/0012; H04W 72/0453; H04W 74/0833; H04W 72/1268;
  (Continued)

(56) References Cited

U.S. PATENT DOCUMENTS 11,350,393 B2 * 5/2022 Ryu ...................... H04W 72/21
11,451,350 B2 * 9/2022 Choi ..................... H04L 5/0053
(Continued)

FOREIGN PATENT DOCUMENTS

CN        109219015 A    1/2019
CN        109309962 A    2/2019
(Continued)

OTHER PUBLICATIONS

3GPP TSG-RAN WG1 Meeting #96, R1-1903368, Summary of contributions on potential enhancements for PUSCH for NR URLLC (AI 7.2.6.1.3), Nokia, Nokia Shanghai Bell, Athens, Greece, Feb. 25-Mar. 1, 2019,total 26 pages.
(Continued)

*Primary Examiner* — Brian D Nguyen
(74) *Attorney, Agent, or Firm* — HUAWEI TECHNOLOGIES CO., LTD.

(57) ABSTRACT

In a method for determining a resource of an asynchronous physical uplink shared channel PUSCH, user equipment (UE) receives time domain resource configuration information and frequency domain resource configuration information from a network device. The UE sets, based on the time domain resource configuration information, a time domain position of a first hop of a first PUSCH and a time domain position of a second hop of the first PUSCH to be inconsecutive in the time domain. The UE then determines a frequency domain position of the first hop of the first PUSCH and a frequency domain position of the second hop of the first PUSCH based on the frequency domain resource configuration information.

19 Claims, 16 Drawing Sheets

(51) Int. Cl.
  *H04W 72/0446* (2023.01)
  *H04W 72/0453* (2023.01)
  *H04W 72/21* (2023.01)
  *H04W 74/08* (2009.01)
  *H04W 74/0833* (2024.01)

(58) Field of Classification Search
  CPC ... H04W 72/21; H04W 72/0446; H04B 1/713
  See application file for complete search history.

(56) References Cited

U.S. PATENT DOCUMENTS

| | | | | |
|---|---|---|---|---|
| 2017/0238305 | A1* | 8/2017 | Chen | H04W 52/38 370/311 |
| 2018/0183491 | A1 | 6/2018 | Takeda et al. | |
| 2019/0013912 | A1 | 1/2019 | Tomeba et al. | |
| 2020/0383105 | A1* | 12/2020 | Park | H04L 1/1896 |
| 2022/0132436 | A1* | 4/2022 | Hoshino | H04L 5/0048 |
| 2022/0150981 | A1* | 5/2022 | Lin | H04L 5/0012 |
| 2022/0191903 | A1* | 6/2022 | Bae | H04L 1/1893 |

FOREIGN PATENT DOCUMENTS

| | | |
|---|---|---|
| CN | 109417815 A | 3/2019 |
| CN | 109803407 A | 5/2019 |
| EP | 3609264 A1 | 2/2020 |
| EP | 3713171 A1 | 9/2020 |
| JP | 2013530627 A | 7/2013 |
| JP | 2019525542 A | 9/2019 |
| JP | 2021503794 A | 2/2021 |
| WO | 2018009690 A1 | 1/2018 |
| WO | 2019029305 A1 | 2/2019 |
| WO | 2019096030 A1 | 5/2019 |
| WO | 2019097654 A1 | 5/2019 |
| WO | 2019097655 A1 | 5/2019 |
| WO | 2019099137 A1 | 5/2019 |

OTHER PUBLICATIONS

3GPP TSG RAN WG1 #97, R1-1906511, Discussion on channel structure for two-step RACH,CMCC,Reno, USA, May 13-May 17, 2019,total 5 pages.

3GPP TSG RAN WG1 #97,R1-1906580,On Channel Structure for 2-step RACH,OPPO,Reno, USA, May 13-17, 2019,total 13 pages.

3GPP TS 38.213 V15.5.0 (Mar. 2019), 3rd Generation Partnership Project; Technical Specification Group Radio Access Network; NR; Physical layer procedures for control(Release 15), 104 pages.

3GPP TS 38.214 V15.5.0 (Mar. 2019), 3rd Generation Partnership Project; Technical Specification Group Radio Access Network; NR; Physical layer procedures for data(Release 15), 103 pages.

* cited by examiner

METHOD FOR DETERMINING RESOURCE OF ASYNCHRONOUS PHYSICAL UPLINK SHARED CHANNEL AND DEVICE

CROSS-REFERENCE TO RELATED APPLICATIONS

This application is a continuation of International Application No. PCT/CN2020/093536, filed on May 29, 2020, which claims priority to Chinese Patent Application No. 201910465097.6, filed on May 30, 2019. The disclosures of the aforementioned applications are hereby incorporated by reference in their entirety.

TECHNICAL FIELD

This application relates to the field of communications technologies, and in particular, to a method for determining a resource of an asynchronous physical uplink shared channel and a device.

BACKGROUND

In a wireless communications system, user equipment (UE) may enter a radio resource control (RRC) connected mode from an RRC idle mode or an RRC inactive mode through random access. After entering the RRC connected mode, the UE establishes a bearer with a network device, obtains some resources and parameter configurations from the network device through the bearer, and communicates with the network device based on the obtained resources and parameter configurations.

Currently, the UE usually enters the RRC connected mode from the RRC idle mode or the RRC inactive mode in a four-step random access manner. For example, when new uplink data arrives at the UE, the UE sends a first message (including a random access preamble) to the network device; after receiving the first message, the network device returns a second message (including a random access response) to the user equipment to obtain uplink synchronization; the user equipment receives the second message, and sends a third message (including a physical uplink shared channel (PUSCH)) to the network device; after receiving the third message, the network device returns a fourth message (including an identifier of the third message, where the identifier of the third message is used to indicate successfully connected UE) to the user equipment. However, in this process, the UE and the network device need to exchange information for four times. Consequently, PUSCH transmission latency is relatively high, and signaling overheads are relatively high.

To reduce the PUSCH transmission latency and the signaling overheads, a two-step random access manner is proposed in the industry. For example, when new uplink data arrives at the UE, before performing the uplink synchronization, the UE may send a message MsgA (including a random access preamble and a PUSCH) to the network device; the network device receives the message MsgA, and sends a message MsgB to the UE (where, for example, the MsgB is used to implement functions of the Msg2 and the Msg4). In the two-step random access manner, the UE sends the PUSCH to the network device before the uplink synchronization, that is, the UE transmits the PUSCH asynchronously. When a plurality of UEs asynchronously transmit PUSCHs through intra-slot frequency hopping, inter-symbol interference may be caused due to uplink asynchronous transmission performed by different user equipments.

SUMMARY

Embodiments of this application provide a method for sending a physical uplink shared channel and a device, to resolve a problem of inter-symbol interference caused by asynchronous transmission of physical uplink shared channels PUSCHs by different user equipments through intra-slot frequency hopping, so that user experience is improved.

To achieve the foregoing objective, the following technical solutions are used in the embodiments of this application.

According to a first aspect, an embodiment of this application provides a method for sending a physical uplink shared channel. The method includes: User equipment receives time domain resource configuration information and frequency domain resource configuration information from a network device. The time domain resource configuration information includes time domain resource configuration information of a first PUSCH, and the frequency domain resource configuration information includes frequency domain resource configuration information of the first PUSCH. A time domain resource of the first PUSCH is located in one slot, and a frequency-domain frequency hopping type of the first PUSCH is intra-slot frequency hopping. The user equipment determines a time domain position of a first hop of the first PUSCH and a time domain position of a second hop of the first PUSCH based on the time domain resource configuration information. The time domain position of the first hop of the first PUSCH and the time domain position of the second hop of the first PUSCH are inconsecutive in time domain. The user equipment determines a frequency domain position of the first hop of the first PUSCH and a frequency domain position of the second hop of the first PUSCH based on the frequency domain resource configuration information of the first PUSCH. A frequency domain resource occupied by the first hop of the first PUSCH is different from a frequency domain resource occupied by the second hop of the first PUSCH.

In the technical solution provided in the first aspect, the user equipment may determine the time domain position of the first hop of the first PUSCH and the time domain position of the second hop of the first PUSCH based on the time domain resource configuration information, and determine the frequency domain position of the first hop of the first PUSCH and the frequency domain position of the second hop of the first PUSCH based on the frequency domain resource configuration information of the first PUSCH. The time domain position of the first hop of the first PUSCH and the time domain position of the second hop of the first PUSCH are inconsecutive in time domain, and the frequency domain resource occupied by the first hop of the first PUSCH is different from the frequency domain resource occupied by the second hop of the first PUSCH. Therefore, a problem of inter-symbol interference caused by asynchronous transmission of physical uplink shared channels PUSCHs by different user equipments through intra-slot frequency hopping may be resolved, so that user experience is improved.

With reference to the first aspect, in a first possible implementation, that the time domain position of the first hop of the first PUSCH and the time domain position of the second hop of the first PUSCH are inconsecutive in time domain includes: A time-domain end position of the first hop of the first PUSCH and a time-domain start position of the second hop of the first PUSCH are spaced by first time-domain duration. In the technical solution provided in the first possible implementation of the first aspect, for the user equipment that sends the physical uplink shared channel through intra-slot frequency hopping of the frequency-domain frequency hopping type, the time-domain end position of the first hop of the first PUSCH and the time-domain start position of the second hop of the first PUSCH may be spaced by the first time-domain duration, to avoid inter-symbol interference caused by asynchronous transmission by different user equipments, so that user experience is improved.

With reference to the first possible implementation of the first aspect, in a second possible implementation, the first time-domain duration is predefined time-domain duration; the first time-domain duration is determined by the user equipment based on received information about the first time-domain duration; the first time-domain duration is determined by the user equipment based on received information about second time-domain duration, where the second time-domain duration is an interval between a time-domain end position of the first PUSCH and a time-domain start position of a second PUSCH, and a time-frequency resource of the second PUSCH is located after a time-frequency resource of the first PUSCH; or the first time-domain duration is determined by the user equipment based on the time domain resource configuration information. In the technical solution provided in the second possible implementation of the first aspect, the user equipment may pre-define the first time-domain duration, determine the first time-domain duration based on the received information about the first time-domain duration, determine the first time-domain duration based on the received information about the second time-domain duration, or determine the first time-domain duration based on the time domain resource configuration information, to avoid inter-symbol interference caused by asynchronous transmission by different user equipments, so that user experience is improved.

With reference to the second possible implementation of the first aspect, in a third possible implementation, the time domain resource configuration information of the first PUSCH includes information used to determine a time-domain start position of the first PUSCH and information used to determine time-domain duration of the first PUSCH; and that the first time-domain duration is determined by the user equipment based on the time domain resource configuration information includes: When the time-frequency resource of the second PUSCH that is located after the time-frequency resource of the first PUSCH does not exist in the slot, the user equipment determines the first time-domain duration based on a total quantity of symbols in the slot, the time-domain start position of the first PUSCH, and the time-domain duration of the first PUSCH. In the technical solution provided in the third possible implementation of the first aspect, when the time-frequency resource of the second PUSCH that is located after the time-frequency resource of the first PUSCH does not exist in the slot, the user equipment may determine the first time-domain duration based on the total quantity of symbols in the slot, the time-domain start position of the first PUSCH, and the time-domain duration of the first PUSCH, to avoid inter-symbol interference caused by asynchronous transmission by different user equipments, so that user experience is improved.

With reference to the second possible implementation of the first aspect, in a fourth possible implementation, the time domain resource configuration information of the first PUSCH includes information used to determine a time-domain start position of the first PUSCH and information used to determine time-domain duration of the first PUSCH; and that the first time-domain duration is determined by the user equipment based on the time domain resource configuration information includes: When the time-frequency resource of the second PUSCH that is located after the time-frequency resource of the first PUSCH exists in the slot, the user equipment determines the first time-domain duration based on the time-domain start position of the second PUSCH, the time-domain start position of the first PUSCH, and the time-domain duration of the first PUSCH. In the technical solution provided in the fourth possible implementation of the first aspect, when the time-frequency resource of the second PUSCH that is located after the time-frequency resource of the first PUSCH exists in the slot, the user equipment may determine the first time-domain duration based on the time-domain start position of the second PUSCH, the time-domain start position of the first PUSCH, and the time-domain duration of the first PUSCH, to avoid inter-symbol interference caused by asynchronous transmission by different user equipments, so that user experience is improved.

With reference to the first aspect and the possible implementations of the first aspect, in a fifth possible implementation, the frequency domain resource configuration information further includes configuration information of a frequency domain offset; and that the user equipment determines a frequency domain position of the first hop of the first PUSCH and a frequency domain position of the second hop of the first PUSCH based on the frequency domain resource configuration information of the first PUSCH includes: The user equipment determines a frequency-domain start position of the first hop of the first PUSCH based on the frequency domain resource configuration information of the first PUSCH, and determines a frequency-domain start position of the second hop of the first PUSCH based on the frequency-domain start position of the first hop of the first PUSCH, the frequency domain offset, and a total quantity of resource blocks. In the technical solution provided in the fifth possible implementation of the first aspect, the user equipment may determine the frequency-domain start position of the first hop of the first PUSCH based on the frequency domain resource configuration information of the first PUSCH, and determine the frequency-domain start position of the second hop of the first PUSCH based on the frequency-domain start position of the first hop of the first PUSCH, the frequency domain offset, and the total quantity of resource blocks.

With reference to the fifth possible implementation of the first aspect, in a sixth possible implementation, the total quantity of resource blocks includes a quantity of resource blocks in an active uplink bandwidth part BWP; the total quantity of resource blocks includes a quantity of resource blocks in an uplink bandwidth part BWP in which the first PUSCH is located; the total quantity of resource blocks includes a quantity of resource blocks in an uplink bandwidth part BWP in which a physical random access channel PRACH associated with the first PUSCH is located; the total quantity of resource blocks includes a quantity of resource blocks in a time-frequency resource of a PRACH associated with the first PUSCH; or the total quantity of resource blocks includes a quantity of resource blocks in a time-frequency resource group of a PRACH associated with the first PUSCH. In the technical solution provided in the sixth possible implementation of the first aspect, the total quantity of resource blocks may include the quantity of resource blocks in the active uplink bandwidth part BWP, the quantity of resource blocks in the uplink bandwidth part BWP in which the first PUSCH is located, the quantity of resource blocks in the uplink bandwidth part BWP in which the PRACH associated with the first PUSCH is located, the quantity of resource blocks in the time-frequency resource of the physical random access channel PRACH associated with the first PUSCH, or the quantity of resource blocks in the time-frequency resource group of the PRACH associated with the first PUSCH.

According to a second aspect, an embodiment of this application provides a method for determining a resource of an asynchronous physical uplink shared channel PUSCH. The method includes: A network device sends time domain resource configuration information and frequency domain resource configuration information to user equipment. The time domain resource configuration information includes time domain resource configuration information of a first PUSCH, and the frequency domain resource configuration information includes frequency domain resource configuration information of the first PUSCH. A time domain resource of the first PUSCH is located in one slot, and a frequency-domain frequency hopping type of the first PUSCH is intra-slot frequency hopping. The network device determines, based on the time domain resource configuration information, a time domain position that is of a first hop and used to receive the first PUSCH and a time domain position that is of a second hop and used to receive the first PUSCH. The time domain position that is of the first hop and used to receive the first PUSCH and the time domain position that is of the second hop and used to receive the first PUSCH are inconsecutive in time domain. The network device determines, based on the frequency domain resource configuration information of the first PUSCH, a frequency domain position that is of the first hop and used to receive the first PUSCH and a frequency domain position that is of the second hop and used to receive the first PUSCH. A frequency domain resource that is occupied by the first hop and used to receive the first PUSCH is different from a frequency domain resource that is occupied by the second hop and used to receive the first PUSCH.

In the technical solution provided in the second aspect, the network device may send the time domain resource configuration information and the frequency domain resource configuration information to the user equipment, may further determine, based on the time domain resource configuration information, the time domain position that is of the first hop and used to receive the first PUSCH and the time domain position that is of the second hop and used to receive the first PUSCH, and may further determine, based on the frequency domain resource configuration information, the frequency domain position that is of the first hop and used to receive the first PUSCH and the frequency domain position that is of the second hop and used to receive the first PUSCH. The time domain position that is of the first hop and used to receive the first PUSCH and the time domain position that is of the second hop and used to receive the first PUSCH are inconsecutive in time domain, and the frequency domain resource that is occupied by the first hop and used to receive the first PUSCH is different from the frequency domain resource that is occupied by the second hop and used to receive the first PUSCH. Therefore, a problem of inter-symbol interference caused by asynchronous transmission of physical uplink shared channels PUSCHs by different user equipments through intra-slot frequency hopping may be resolved, so that user experience is improved.

With reference to the second aspect, in a first possible implementation, that the time domain position that is of the first hop and used to receive the first PUSCH and the time domain position that is of the second hop and used to receive the first PUSCH are inconsecutive in time domain includes: A time-domain end position that is of the first hop and used to receive the first PUSCH and a time-domain start position that is of the second hop and used to receive the first PUSCH are spaced by first time-domain duration. In the technical solution provided in the first possible implementation of the second aspect, for the user equipment that sends the physical uplink shared channel through intra-slot frequency hopping of the frequency-domain frequency hopping type, the time-domain end position that is of the first hop and used to receive the first PUSCH and the time-domain start position that is of the second hop and used to receive the first PUSCH may be spaced by the first time-domain duration, to avoid inter-symbol interference caused by asynchronous transmission by different user equipments, so that user experience is improved.

With reference to the first possible implementation of the second aspect, in a second possible implementation, the first time-domain duration is predefined time-domain duration; the first time-domain duration is determined by the network device based on information that is about the first time-domain duration and sent to the user equipment; the first time-domain duration is determined by the network device based on information that is about second time-domain duration and sent to the user equipment, where the second time-domain duration is an interval between a time-domain end position of the first PUSCH and a time-domain start position of a second PUSCH, and a time-frequency resource of the second PUSCH is located after a time-frequency resource of the first PUSCH; or the first time-domain duration is determined by the network device based on the time domain resource configuration information sent to the user equipment. In the technical solution provided in the second possible implementation of the second aspect, the network device may determine the first time-domain duration based on the predefined time-domain duration, the information that is about the first time-domain duration and sent to the user equipment, the information that is about the second time-domain duration and sent to the user equipment, or the time domain resource configuration information sent to the user equipment, so that the network device receives the first PUSCH based on the first time-domain duration, the time domain resource configuration information, and the frequency domain resource configuration information.

With reference to the second possible implementation of the second aspect, in a third possible implementation, the time domain resource configuration information of the first PUSCH includes information used to determine a time-domain start position of the first PUSCH and information used to determine time-domain duration of the first PUSCH; and that the first time-domain duration is determined by the network device based on the time domain resource configuration information sent to the user equipment includes: When the time-frequency resource of the second PUSCH that is located after the time-frequency resource of the first PUSCH does not exist in the slot, the network device determines the first time-domain duration based on a total quantity of symbols in the slot, the time-domain start position of the first PUSCH, and the time-domain duration of the first PUSCH. In the technical solution provided in the third possible implementation of the second aspect, when the time-frequency resource of the second PUSCH that is located after the time-frequency resource of the first PUSCH does not exist in the slot, the network device may determine the first time-domain duration based on the total quantity of symbols in the slot, the time-domain start position of the first PUSCH, and the time-domain duration of the first PUSCH. Therefore, a problem of inter-symbol interference caused by asynchronous transmission of physical uplink shared channels PUSCHs by different user equipments through intra-slot frequency hopping may be resolved, so that user experience is improved.

With reference to the second possible implementation of the second aspect, in a fourth possible implementation, the time domain resource configuration information of the first PUSCH includes information used to determine a time-domain start position of the first PUSCH and information used to determine time-domain duration of the first PUSCH; and that the first time-domain duration is determined by the network device based on the time domain resource configuration information sent to the user equipment includes: When the time-frequency resource of the second PUSCH that is located after the time-frequency resource of the first PUSCH exists in the slot, the network device determines the first time-domain duration based on the time-domain start position of the second PUSCH, the time-domain start position of the first PUSCH, and the time-domain duration of the first PUSCH. In the technical solution provided in the fourth possible implementation of the second aspect, when the time-frequency resource of the second PUSCH that is located after the time-frequency resource of the first PUSCH exists in the slot, the network device may determine the first time-domain duration based on the time-domain start position of the second PUSCH, the time-domain start position of the first PUSCH, and the time-domain duration of the first PUSCH. Therefore, a problem of inter-symbol interference caused by asynchronous transmission of physical uplink shared channels PUSCHs by different user equipments through intra-slot frequency hopping may be resolved, so that user experience is improved.

With reference to the second aspect and the possible implementations of the second aspect, in a fifth possible implementation, the frequency domain resource configuration information further includes configuration information of a frequency domain offset; and that the network device determines, based on the frequency domain resource configuration information of the first PUSCH, a frequency domain position that is of the first hop and used to receive the first PUSCH and a frequency domain position that is of the second hop and used to receive the first PUSCH includes: The network device determines, based on the frequency domain resource configuration information of the first PUSCH, a frequency-domain start position that is of the first hop and used to receive the first PUSCH; and the network device determines, based on the frequency-domain start position that is of the first hop and used to receive the first PUSCH, the frequency domain offset, and a total quantity of resource blocks, a frequency-domain start position that is of the second hop and used to receive the first PUSCH. In the technical solution provided in the fifth possible implementation of the second aspect, the network device may determine, based on the frequency domain resource configuration information of the first PUSCH, the frequency-domain start position that is of the first hop and used to receive the first PUSCH, and determine, based on the frequency-domain start position of the first hop of the first PUSCH, the frequency domain offset, and the total quantity of resource blocks, the frequency-domain start position that is of the second hop and used to receive the first PUSCH.

With reference to the fifth possible implementation of the second aspect, in a sixth possible implementation, the total quantity of resource blocks includes a quantity of resource blocks in an active uplink bandwidth part BWP; the total quantity of resource blocks includes a quantity of resource blocks in an uplink bandwidth part BWP in which the first PUSCH is located; the total quantity of resource blocks includes a quantity of resource blocks in an uplink bandwidth part BWP in which a physical random access channel PRACH associated with the first PUSCH is located; the total quantity of resource blocks includes a quantity of resource blocks in a time-frequency resource of a PRACH associated with the first PUSCH; or the total quantity of resource blocks includes a quantity of resource blocks in a time-frequency resource group of a PRACH associated with the first PUSCH. In the technical solution provided in the sixth possible implementation of the second aspect, the total quantity of resource blocks may include the quantity of resource blocks in the active uplink bandwidth part BWP, the quantity of resource blocks in the uplink bandwidth part BWP in which the first PUSCH is located, the quantity of resource blocks in the uplink bandwidth part BWP in which the PRACH associated with the first PUSCH is located, the quantity of resource blocks in the time-frequency resource of the physical random access channel PRACH associated with the first PUSCH, or the quantity of resource blocks in the time-frequency resource group of the PRACH associated with the first PUSCH.

With reference to the second possible implementation of the second aspect, the third possible implementation of the second aspect, the fourth possible implementation of the second aspect, the fifth possible implementation of the second aspect, and the sixth possible implementation of the second aspect, in a seventh possible implementation, the method further includes: The network device sends the information about the first time-domain duration to the user equipment. In the technical solution provided in the seventh possible implementation of the second aspect, after determining the first time-domain duration, the network device may send the information about the first time-domain duration to the user equipment, so that the user equipment determines the first time-domain duration based on the information about the first time-domain duration.

According to a third aspect, an embodiment of this application provides user equipment. The user equipment has a function of implementing the method according to the first aspect. The function may be implemented by hardware, or may be implemented by hardware executing corresponding software. The hardware or the software includes one or more modules corresponding to the function.

According to a fourth aspect, an embodiment of this application provides a network device. The network device has a function of implementing the method according to the second aspect. The function may be implemented by hardware, or may be implemented by hardware executing corresponding software. The hardware or the software includes one or more modules corresponding to the function.

According to a fifth aspect, an embodiment of this application provides a communications apparatus, including at least one processor, at least one memory, and a communications interface. The communications interface, the at least one memory, and the at least one processor are coupled. The communications apparatus communicates with another device through the communications interface. The at least one memory is configured to store a computer program, so that when the computer program is executed by the at least one processor, the method for determining a resource of an asynchronous physical uplink shared channel according to the first aspect and the possible implementations of the first aspect is implemented.

According to a sixth aspect, an embodiment of this application provides a communications apparatus, including at least one processor, at least one memory, and a communications interface. The communications interface, the at least one memory, and the at least one processor are coupled. The communications apparatus communicates with another device through the communications interface. The at least one memory is configured to store a computer program, so that when the computer program is executed by the at least one processor, the method for determining a resource of an asynchronous physical uplink shared channel according to the second aspect and the possible implementations of the second aspect is implemented.

According to a seventh aspect, this application provides a system chip. The system chip may be used in a communications apparatus. The system chip includes at least one processor. A related program instruction is executed in the at least one processor, so that the communications apparatus in which the system chip is installed implements the method according to the first aspect and a function of the user equipment according to any one of the designs of the first aspect. Optionally, the system chip may further include at least one memory, and the memory stores the related program instruction.

According to an eighth aspect, this application provides a system chip. The system chip may be used in a communications apparatus. The system chip includes at least one processor. A related program instruction is executed in the at least one processor, so that the communications apparatus in which the system chip is installed implements the method according to the second aspect and a function of the network device according to any one of the designs of the second aspect. Optionally, the system chip may further include at least one memory, and the memory stores the related program instruction.

According to a ninth aspect, an embodiment of this application provides a computer-readable storage medium, for example, a non-transient readable storage medium of a computer. The computer-readable storage medium stores a computer program. When the computer program is run on a communications apparatus, the communications apparatus is enabled to perform the method according to any one of the possible implementations of the first aspect. For example, the computer may be at least one storage node.

According to a tenth aspect, an embodiment of this application provides a computer-readable storage medium, for example, a non-transient readable storage medium of a computer. The computer-readable storage medium stores a computer program. When the computer program is run on a communications apparatus, the communications apparatus is enabled to perform the method according to any one of the possible implementations of the second aspect. For example, the computer may be at least one storage node.

According to an eleventh aspect, an embodiment of this application provides a computer program product. When the computer program product is run on a computer, the method provided in any one of the possible implementations of the first aspect is performed. For example, the computer may be at least one storage node or a communications apparatus.

According to a twelfth aspect, an embodiment of this application provides a computer program product. When the computer program product is run on a computer, the method provided in any one of the possible implementations of the second aspect is performed. For example, the computer may be at least one storage node or a communications apparatus.

According to a thirteenth aspect, an embodiment of this application provides a communications system. The communications system may include any one or more of the following: the user equipment in the third aspect, the network device in the fourth aspect, the communications apparatus in the fifth aspect, the communications apparatus in the sixth aspect, the system chip in the seventh aspect, the system chip in the eighth aspect, the computer storage medium in the ninth aspect, the computer storage medium in the tenth aspect, the computer program product in the eleventh aspect, or the computer program product in the twelfth aspect.

It may be understood that any one of the user equipment, the network device, the communications apparatus, the system chip, the computer storage medium, the computer program product, the communications system, or the like provided above is configured to perform a corresponding method provided above. Therefore, for beneficial effects that can be achieved by any one of the user equipment, the network device, the communications apparatus, the system chip, the computer storage medium, the computer program product, the communications system, or the like, refer to beneficial effects in the corresponding method. Details are not described herein again.

BRIEF DESCRIPTION OF DRAWINGS

FIG. 6(*b*) is a schematic diagram 2 of a time-frequency resource of a PUSCH according to an embodiment of this application;

FIG. 8(*b*)-1 and FIG. 8(*b*)-2 are a schematic flowchart 2 of a method for determining a resource of an asynchronous PUSCH according to an embodiment of this application;

FIG. 9(*b*) is a schematic diagram 4 of a time-frequency resource of a PUSCH according to an embodiment of this application;

FIG. 12(b)-1 and FIG. 12(b)-2 are a schematic flowchart 4 of a method for determining a resource of an asynchronous PUSCH according to an embodiment of this application;

DESCRIPTION OF EMBODIMENTS

The technical solutions provided in this application may be applied to various communications systems, for example, a 5th generation (5G) communications system, a future evolved system, or a plurality of converged communications systems, or may be applied to a communications system. The technical solutions provided in this application may be applied to a plurality of application scenarios of the foregoing communications system, for example, enhanced mobile broadband (eMBB) communication, ultra-reliable low-latency communication (uRLLC), and massive machine-type communications (mMTC). A method provided in embodiments of this application is described below by using only FIG. 1 as an example.

Figure 1:
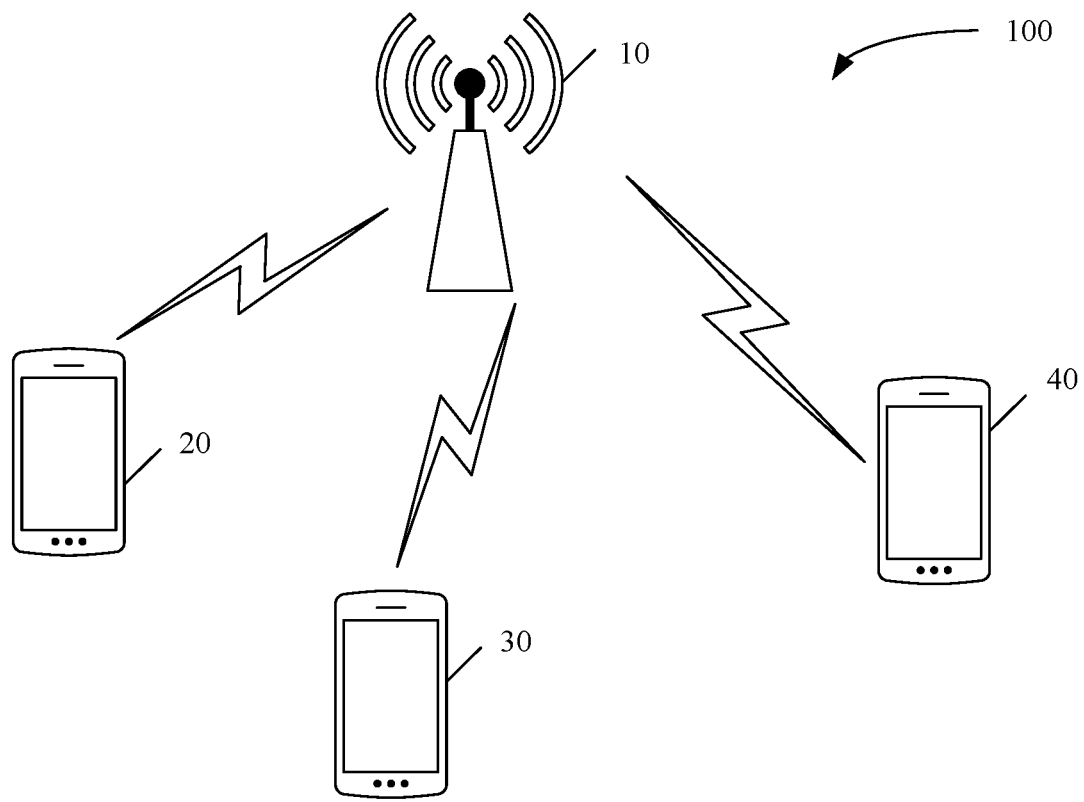
FIG. 1 is a schematic architectural diagram of a communications system according to an embodiment of this application.

FIG. 1 is a schematic architectural diagram of a communications system 100 according to an embodiment of this application. In FIG. 1, the communications system 100 may include one or more network devices 10 (where only one network device is shown) and user equipments 20 to 40 connected to the network device 10. FIG. 1 is merely a schematic diagram, and does not constitute a limitation on a scenario to which the technical solutions provided in this application are applicable.

The network device 10 may be a transmission reception point (TRP), a base station, a relay station, an access point, or the like. The network device 10 may be a network device in a 5G communications system or a network device in a future evolved network. In addition, the network device 10 may alternatively be a base transceiver station (BTS) in a global system for mobile communications (GSM) or code division multiple access (CDMA) network, or may be an NB (NodeB) in wideband code division multiple access (WCDMA), or may be an eNB or an evolutional NodeB (eNodeB) in long term evolution (LTE).

The user equipments 20 to 40 may be access terminals, UE units, UE stations, mobile stations, mobile stations, remote stations, remote terminals, mobile devices, UE terminals, wireless communications devices, UE agents, UE apparatuses, or the like. The access terminal may be a wireless local loop (WLL) station, a personal digital assistant (PDA), a handheld device having a wireless communication function, a computing device or another processing device connected to a wireless modem, a vehicle-mounted device, a wearable device, user equipment in a 5G network, user equipment in a future evolved public land mobile network (PLMN) network, or the like.

In FIG. 1, the network device may provide a wireless access service for user equipment. The network device corresponds to a service coverage area. User equipment that enters the service coverage area of the network device may communicate with the network device through a Uu interface link, to receive the wireless access service provided by the network device. The Uu interface link may be classified into an uplink (UL) and a downlink (DL) based on directions of data transmitted through the Uu interface link. The user equipment may send a PUSCH to the network device through the UL, and the network device may send a physical downlink shared channel (PDSCH) to the user equipment through the DL. For example, in FIG. 1, the user equipment 20 is located within coverage area of the network device 10, the network device 10 may send a PDSCH to the user equipment 20, and the user equipment 20 may send a PUSCH to the network device 10.

Figure 2:
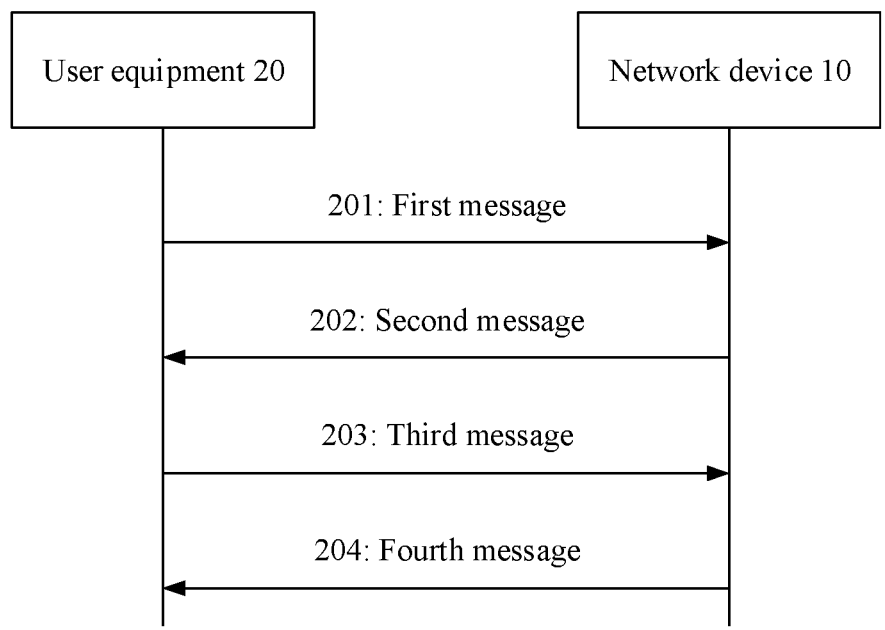
FIG. 2 is a schematic flowchart 1 of a PUSCH sending method according to an embodiment of this application.

In FIG. 1, in a possible design, the user equipment 20 may perform uplink synchronization by performing a four-step random access procedure, and send the PUSCH to the network device 10 after the uplink synchronization. FIG. 2 is a schematic diagram of the four-step random access procedure.

For a specific process, refer to steps 201 to 204.

Step 201: The user equipment 20 sends a first message to the network device 10.

The first message may be a random access preamble.

Step 202: The network device 10 receives the first message from the user equipment 20, and sends a second message to the user equipment 20.

The second message may be a random access response.

Step 203: The user equipment 20 receives the second message from the network device 10, and sends a third message to the network device 10.

The third message may include a to-be-sent PUSCH of the user equipment 20.

Step 204: The network device 10 receives the third message from the user equipment 20, and sends a fourth message to the user equipment 20.

The fourth message may be a contention resolution message. The contention resolution message may include an identifier carried in the third message. The identifier carried in the third message is used to indicate the user equipment that sends the third message including the identifier. The identifier may be carried in the fourth message to indicate successfully connected user equipment.

Based on the method shown in FIG. 2, the user equipment 20 may enter an RRC connected mode from an RRC idle mode or an RRC inactive mode. In the method shown in FIG. 2, information is exchanged for four times, resulting in a relatively high latency. This is not conducive to meeting a low latency requirement of an ultra-reliable low-latency communication (URLLC) service. Most of massive machine-type communications (mMTC) services are sporadic small data packets. For a small data packet, the user equipment 20 also needs to perform steps 201 to 204 to enter the RRC connected mode before sending the small data packet, and then returns to the RRC idle mode or the RRC inactive mode. Consequently, a latency is relatively high, and signaling overheads are relatively high.

In another possible design, the user equipment 20 may alternatively send the PUSCH to the network device 10 by using a two-step random access method. The user equipment 20 may send the PUSCH to the network device 10 in the method shown in FIG. 3.

Figure 3:
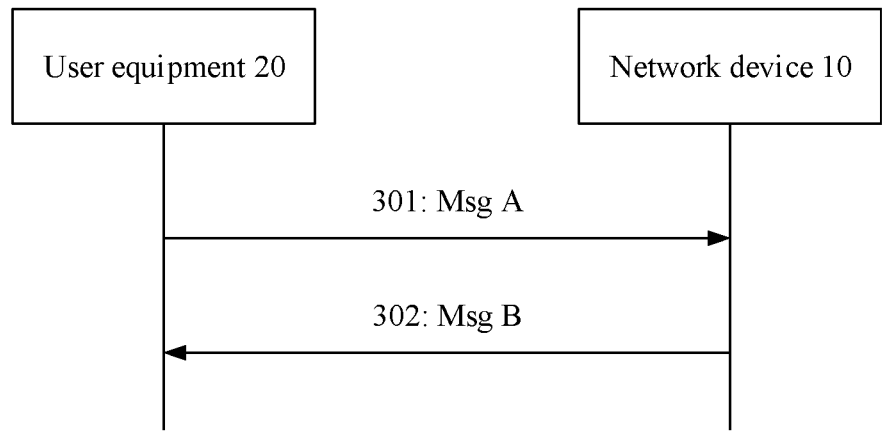
FIG. 3 is a schematic flowchart 2 of a PUSCH sending method according to an embodiment of this application.

PUSCH transmission in FIG. 3 is uplink asynchronous transmission. The uplink asynchronous transmission means that the user equipment does not perform time advance (TA) adjustment when sending information to the network device. In other words, when signals of different user equipments arrive at the network device, a time offset is generated due to different transmission distances. The PUSCH transmission in the two-step random access method is an example of the uplink asynchronous transmission. It may be understood that the uplink asynchronous transmission may alternatively be uplink transmission in another case or scenario. Provided that the user equipment does not perform uplink synchronization processing (for example, not perform the TA adjustment) during the uplink transmission, the uplink transmission is uplink asynchronous transmission.

For a specific process of the two-step random access method, refer to steps 301 and 302.

Step 301: The user equipment 20 sends a MsgA to the network device 10.

The MsgA may include a random access preamble and a to-be-sent PUSCH of the user equipment 20.

Step 302: The network device 10 receives the MsgA from the user equipment 20, and sends a MsgB to the user equipment 20.

The MsgB may include a sequence number of the random access preamble, a cell radio network temporary identifier, an identifier of successfully connected user equipment, and the like.

Based on the method shown in FIG. 3, the user equipment 20 simultaneously sends the random access preamble and the PUSCH in step 301, so that a latency of uplink data transmission is reduced. In addition, the network device 10 may not send uplink resource configuration information to the user equipment, so that signaling overheads may be reduced.

In the method shown in FIG. 3, although the latency of the uplink data transmission and the signaling overheads are reduced, uplink asynchronous transmission of the PUSCH is caused.

The user equipment may asynchronously transmit the PUSCH through frequency-domain frequency hopping.

A frequency-domain frequency hopping type of the PUSCH may be classified into two types: inter-slot frequency hopping and intra-slot frequency hopping.

The inter-slot frequency hopping means that when user equipment performs transmission in a plurality of slots, a frequency domain position of a PUSCH transmitted in a current slot is different from a frequency domain position of a PUSCH transmitted in a next slot.

Figure 4:
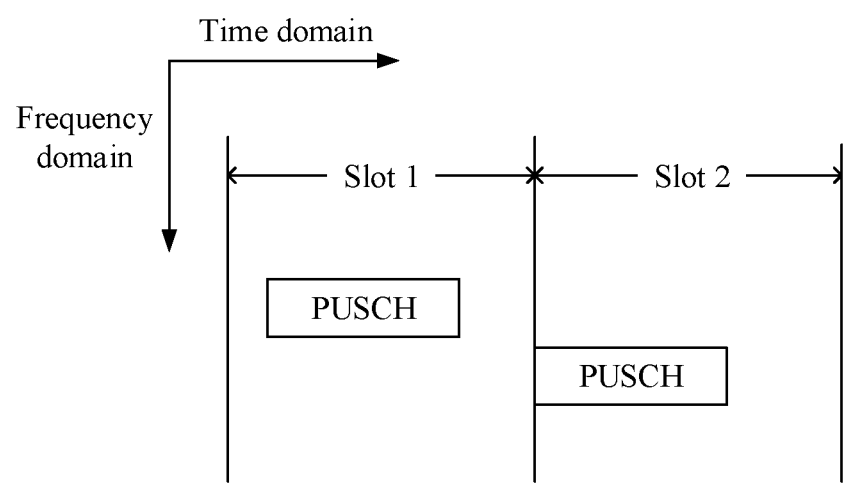
FIG. 4 is a schematic diagram of inter-slot frequency hopping according to an embodiment of this application.

For example, FIG. 4 is a schematic diagram of sending PUSCHs by the user equipment 20 through inter-slot frequency hopping of the frequency-domain frequency hopping type. For example, the user equipment 20 sends PUSCHs to the network device 10 twice. In FIG. 4, a frequency domain position of a PUSCH (a PUSCH in a slot 1) sent by the user equipment 20 to the network device 10 for the first time is different from a frequency domain position of a PUSCH (a PUSCH in a slot 2) sent by the user equipment 20 to the network device 10 for the second time.

The intra-slot frequency hopping means that the user equipment sends a transport block on a plurality of parts of a PUSCH. A time domain resource of the PUSCH is located in one slot, a frequency domain position of each part of the PUSCH is different, and a part of the transport block is sent on the part of the PUSCH.

The intra-slot frequency hopping may be classified into a plurality of modes such as a two-hop mode, a three-hop mode, or a multi-hop mode based on a quantity of PUSCH parts included in one PUSCH. For example, when one PUSCH includes two PUSCH parts, an intra-slot frequency hopping mode is the two-hop mode.

That the intra-slot frequency hopping mode is the two-hop mode is used as an example for description. When the intra-slot frequency hopping mode is the two-hop mode, a first part of the PUSCH may be described as a first hop of the PUSCH, a second part of the PUSCH may be described as a second hop of the PUSCH, the first hop of the PUSCH and the second hop of the PUSCH are in a same slot, and a frequency domain position of the first hop of the PUSCH is different from a frequency domain position of the second hop of the PUSCH.

A person skilled in the art may understand that, if the intra-slot frequency hopping is the three-hop mode, the PUSCH may include a first hop of the PUSCH, a second hop of the PUSCH, and a third hop of the PUSCH. If the intra-slot frequency hopping is the multi-hop mode, the PUSCH may include a first hop of the PUSCH, a second hop of the PUSCH, . . . , and an $R^{th}$ hop of the PUSCH, where R is a positive integer greater than 3. This application is described by using only an example in which the intra-slot frequency hopping mode is the two-hop mode. For a case in which the intra-slot frequency hopping mode is the three-hop mode, refer to the descriptions of the case in which the intra-slot frequency hopping mode is the two-hop mode.

Figure 5:
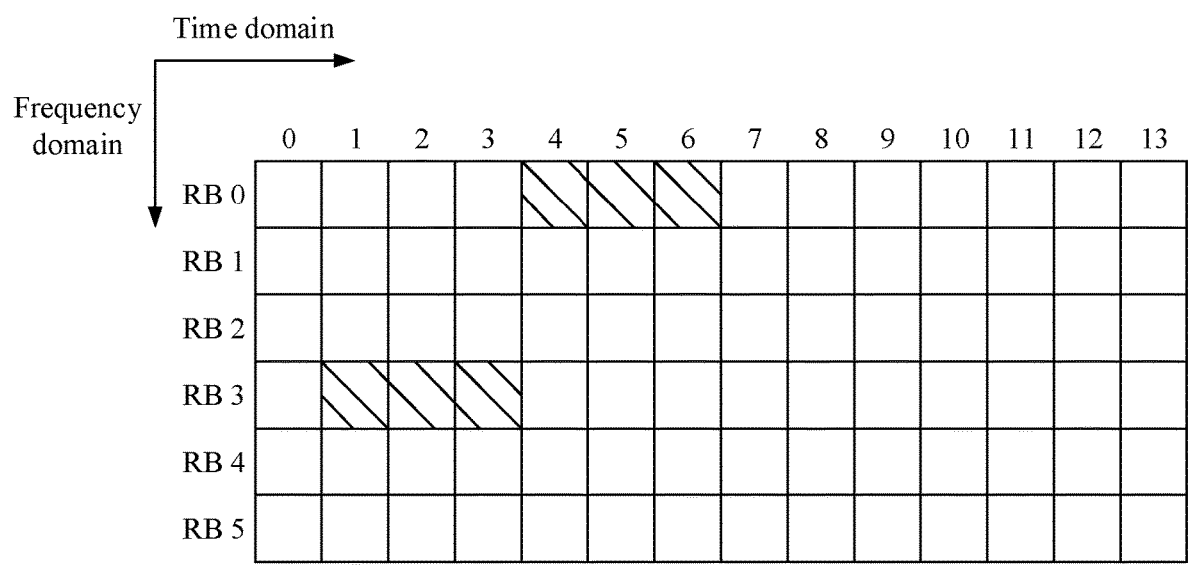
FIG. 5 is a schematic diagram of intra-slot frequency hopping according to an embodiment of this application.

For example, FIG. 5 is a schematic diagram of sending a PUSCH by the user equipment 20 through intra-slot frequency hopping of the frequency-domain frequency hopping type. In FIG. 5, an example in which a quantity of symbols in one slot is 14 and a frequency domain resource includes six resource blocks (RBs) is used for description. A time-domain start position of a first hop of a PUSCH sent by the user equipment 20 is a symbol 1, and a symbol length of the first hop of the PUSCH is 3. A time-domain start position of a second hop of the PUSCH is a symbol 4, and a symbol length of the second hop of the PUSCH is 3. A frequency-domain start position of the first hop of the PUSCH sent by the user equipment 20 is an RB 3, and a quantity of RBs of the first hop of the PUSCH is 1. A frequency-domain start position of the second hop of the PUSCH is an RB 0, and a quantity of RBs of the second hop of the PUSCH is 1.

When a plurality of user equipments transmit PUSCHs in a same slot through intra-slot frequency hopping, and at least one of the plurality of user equipments asynchronously transmits a PUSCH, inter-symbol interference is generated. For example, when the user equipment 20 asynchronously transmits a PUSCH 1 in a slot through intra-slot frequency hopping, and the user equipment 30 synchronously transmits a PUSCH 2 in the slot through intra-slot frequency hopping, a distance between the user equipment 20 and the network device 10 is different from a distance between the user equipment 30 and the network device 10, the user equipment 20 asynchronously transmits the PUSCH 1, and the user equipment 30 synchronously transmits the PUSCH 2. Consequently, although the network device 10 configures the user equipment 20 and the user equipment 30 to start to send the PUSCH 1 and the PUSCH 2 at a same symbol and different frequency domain positions in the slot, the network device 10 may still receive data of a first hop of the PUSCH 1 and data of a second hop of the PUSCH 2 simultaneously at a frequency domain position, generating inter-symbol interference.

An example in which the user equipment 20 and the user equipment 30 in FIG. 1 perform the method shown in FIG. 3 through intra-slot frequency hopping of the frequency-domain frequency hopping type is used below for description. The distance between the user equipment 30 and the network device 10 is greater than the distance between the user equipment 20 and the network device 10. A moment at which the user equipment 20 sends the PUSCH 1 to the network device 10 is T1, a moment at which the user equipment 30 sends the PUSCH 2 to the network device 10 is T2, a moment at which the network device 10 receives the PUSCH 1 sent by the user equipment 20 is T3, a moment at which the network device 10 receives the PUSCH 2 sent by the user equipment 30 is T4, a symbol length of the PUSCH 1 is greater than a symbol length of the PUSCH 2, and a frequency domain resource includes six resource blocks, where T1<T2<T3<T4, and T3−T1<T4−T2.

Figure 6A:
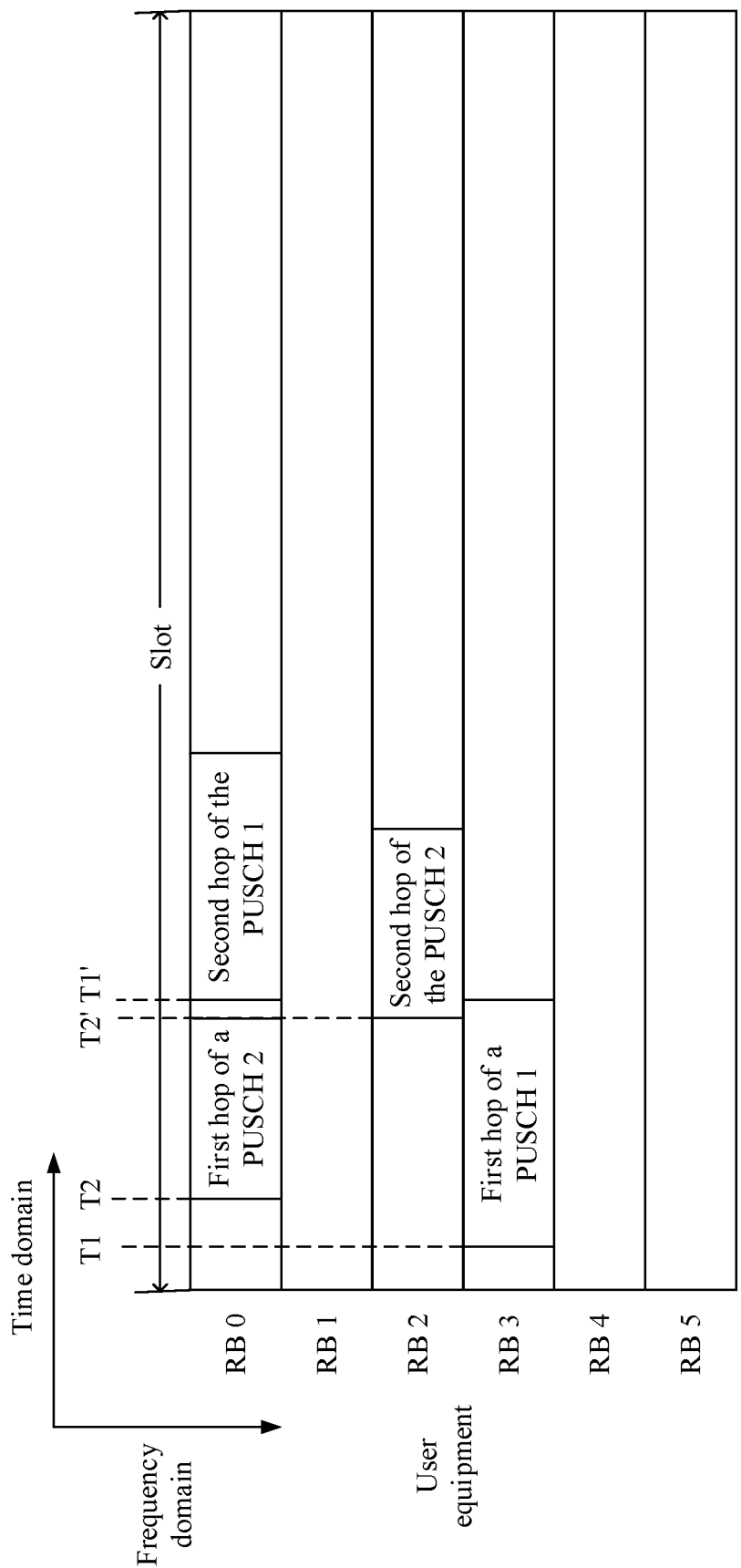
FIG. 6(*a*) is a schematic diagram 1 of a time-frequency resource of a PUSCH according to an embodiment of this application.
Figure 6B:
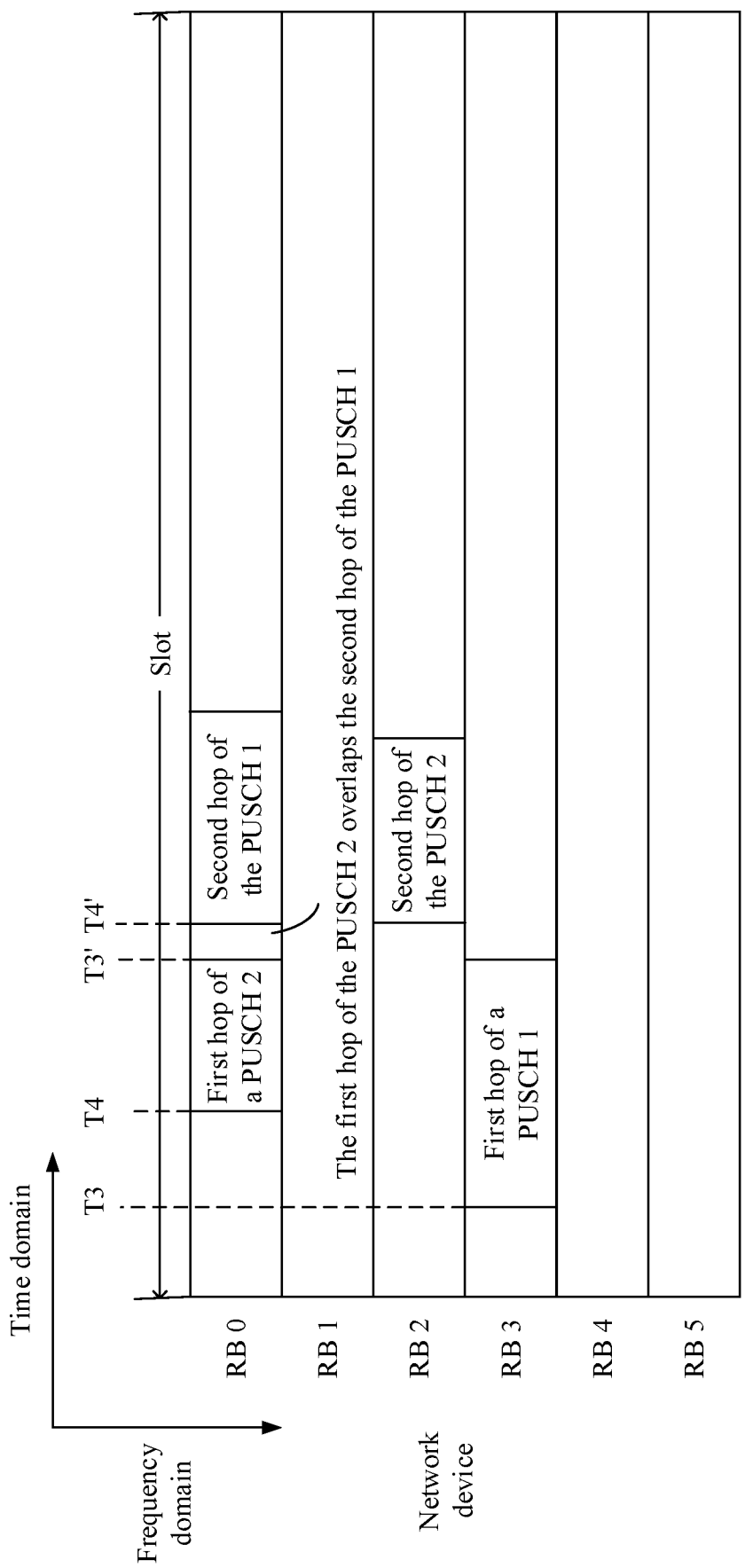

FIG. 6(*a*) is a schematic diagram of a time-frequency resource for sending the PUSCHs by the user equipment 20 and the user equipment 30. In FIG. 6(*a*), the user equipment 20 sends data of a first hop of the PUSCH 1 to the network device 10 on an RB 3 at the moment T1, and sends data of a second hop of the PUSCH 1 to the network device 10 on an RB 0 at a moment T1'. The user equipment 30 sends data of a first hop of the PUSCH 2 to the network device 10 on the RB 0 at the moment T2, and sends data of a second hop of the PUSCH 2 to the network device 10 on an RB 2 at a moment T2'.

Because the distance between the user equipment 30 and the network device 10 is greater than the distance between the user equipment 20 and the network device 10, signal propagation time of the PUSCH sent by the user equipment 30 is greater than signal propagation time of the PUSCH sent by the user equipment 20 (that is, T3−T1<T4−T2). In FIG. 6(*b*), data of a first hop of the PUSCH 1 from the user equipment 20 arrives at the network device 10 on an RB 3 at the moment T3, and data of a second hop of the PUSCH 1 from the user equipment 20 arrives at the network device 10 on an RB 0 at a moment T3'. Data of a first hop of the PUSCH 2 from the network device 30 arrives at the network device 10 on the RB 0 at the moment T4, and data of a second hop of the PUSCH 2 from the user equipment 30 arrives at the network device 10 on an RB 2 at a moment T4'. It may be learned from FIG. 6(*b*) that, for the RB 0, the data of the first hop of the PUSCH 2 and the data of the second hop of the PUSCH 1 overlap on the network device from the moment T3' to the moment T4', generating inter-symbol interference.

To resolve a problem of inter-symbol interference caused by asynchronous transmission of PUSCHs by different user equipments through intra-slot frequency hopping of the frequency-domain frequency hopping type, this application provides a method for determining a resource of an asynchronous PUSCH. User equipment may receive time domain resource configuration information and frequency domain resource configuration information from a network device, determine a time domain position of a first hop of a first PUSCH and a time domain position of a second hop of the first PUSCH based on the time domain resource configuration information, and determine a frequency domain position of the first hop of the first PUSCH and a frequency domain position of the second hop of the first PUSCH based on the frequency domain resource configuration information. The time domain position of the first hop of the first PUSCH and the time domain position of the second hop of the first PUSCH are inconsecutive in time domain. For a specific process of the method, refer to embodiments corresponding to the methods shown in FIG. 8(*a*) and FIG. 12(*a*).

Figure 7:
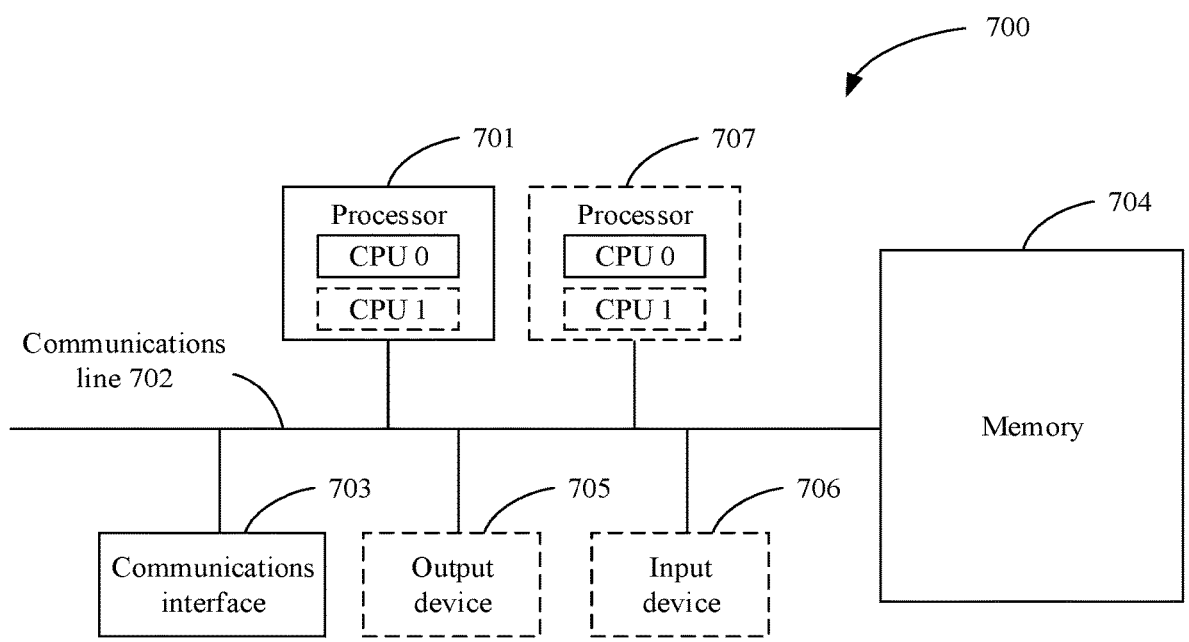
FIG. 7 is a schematic diagram of a hardware structure of a communications device according to an embodiment of this application.

During specific implementation, each device (for example, the network device 10 or the user equipment 20) shown in FIG. 1 may use a composition structure shown in FIG. 7, or include components shown in FIG. 7. Optionally, each network element (for example, the network device 10 or the user equipment 20) in FIG. 1 is implemented by one device, or is a functional module in one device. This is not specifically limited in the embodiments of this application. It may be understood that the foregoing function may be a network element in a hardware device, a software function running on dedicated hardware, or a virtualized function instantiated on a platform.

FIG. 7 is a schematic composition diagram of a communications apparatus 700 according to an embodiment of this application. The communications apparatus 700 may be a centralized controller, a chip or system-on-a-chip in a centralized controller, a functional entity, or a chip or system-on-a-chip in a functional entity. The communications apparatus 700 includes a processor 701, a communications line 702, and a communications interface 703.

Further, the communications apparatus 700 may further include a memory 704. The processor 701, the memory 704, and the communications interface 703 may be connected to each other through the communications line 702.

The processor 701 may be a central processing unit (CPU), a general-purpose processor, a network processor (NP), a digital signal processor (DSP), a microprocessor, a microcontroller, a programmable logic device (PLD), or any combination thereof. The processor 701 may alternatively be any other apparatus having a processing function, for example, a circuit, a component, or a software module. This is not limited.

The communications line 702 is configured to transmit information between components included in the communications apparatus 700.

The communications interface 703 is configured to communicate with another device or another communications network. Another communications network may be the Ethernet, a radio access network (RAN), a wireless local area network (WLAN), or the like. The communications interface 703 may be a module, a circuit, a transceiver, or any apparatus that can implement communication.

The memory 704 is configured to store an instruction. The instruction may be a computer program.

The memory 704 may be a read-only memory (read-only memory, ROM) or another type of static storage device capable of storing static information and/or an instruction, may be a random access memory (random access memory, RAM) or another type of dynamic storage device capable of storing information and/or an instruction, or may be an electrically erasable programmable read-only memory (EEPROM), a compact disc read-only memory (CD-ROM), another compact disc storage, an optical disc storage (including a compressed optical disc, a laser disc, an optical disc, a digital versatile disc, a Blu-ray optical disc, and the like), a magnetic disk storage medium, another magnetic storage device, or the like, and is not limited thereto.

It should be noted that the memory 704 may be independent of the processor 701, or may be integrated with the processor 701. The memory 704 may be configured to store an instruction, program code, data, or the like. The memory 704 may be located inside the communications apparatus 700, or may be located outside the communications apparatus 700. This is not limited.

The processor 701 is configured to execute the instruction stored in the memory 704, to implement a method for determining a resource of an asynchronous PUSCH provided in the following embodiments of this application.

In an example, the processor 701 may include one or more CPUs, for example, a CPU 0 and a CPU 1 in FIG. 7.

In an optional implementation, the communications apparatus 700 may include a plurality of processors. For example, in addition to the processor 701 in FIG. 7, the communications apparatus 700 may further include a processor 707.

In an optional implementation, the communications apparatus 700 further includes an output device 705 and an input device 706. For example, the input device 706 is a device, such as a keyboard, a mouse, a microphone, or a joystick, and the output device 705 is device, such as a display or a speaker.

It should be noted that the communications apparatus 700 may be a desktop computer, a portable computer, a network server, a mobile phone, a tablet computer, a wireless terminal, an embedded device, a chip system, or a device having a structure similar to that in FIG. 7. In addition, the composition structure shown in FIG. 7 does not constitute a limitation on the communications apparatus. In addition to the components shown in FIG. 7, the communications apparatus may include more or fewer components than those shown in the figure, or some components may be combined, or different component arrangements may be used.

In the embodiments of this application, the chip system may include a chip, or may include a chip and another discrete component.

In addition, for actions, terms, and the like in the embodiments of this application, refer to each other. This is not limited. In this embodiment of this application, names of messages exchanged between the devices or names of parameters in the messages are merely examples, and other names may also be used during specific implementation. This is not limited.

It may be understood that in the embodiments of this application, the user equipment and/or the network device may perform some or all of steps in the embodiments of this application. These steps or operations are merely examples. In the embodiments of this application, other steps or variations of various steps may further be performed. In addition, the steps may be performed in a sequence different from a sequence presented in the embodiments of this application, and it is possible that not all the steps in the embodiments of this application need to be performed.

The method for determining a resource of an asynchronous PUSCH provided in the embodiments of this application is described below by using the architecture shown in FIG. 1 as an example. A device in the following embodiments may have the components shown in FIG. 7.

Figure 8A:
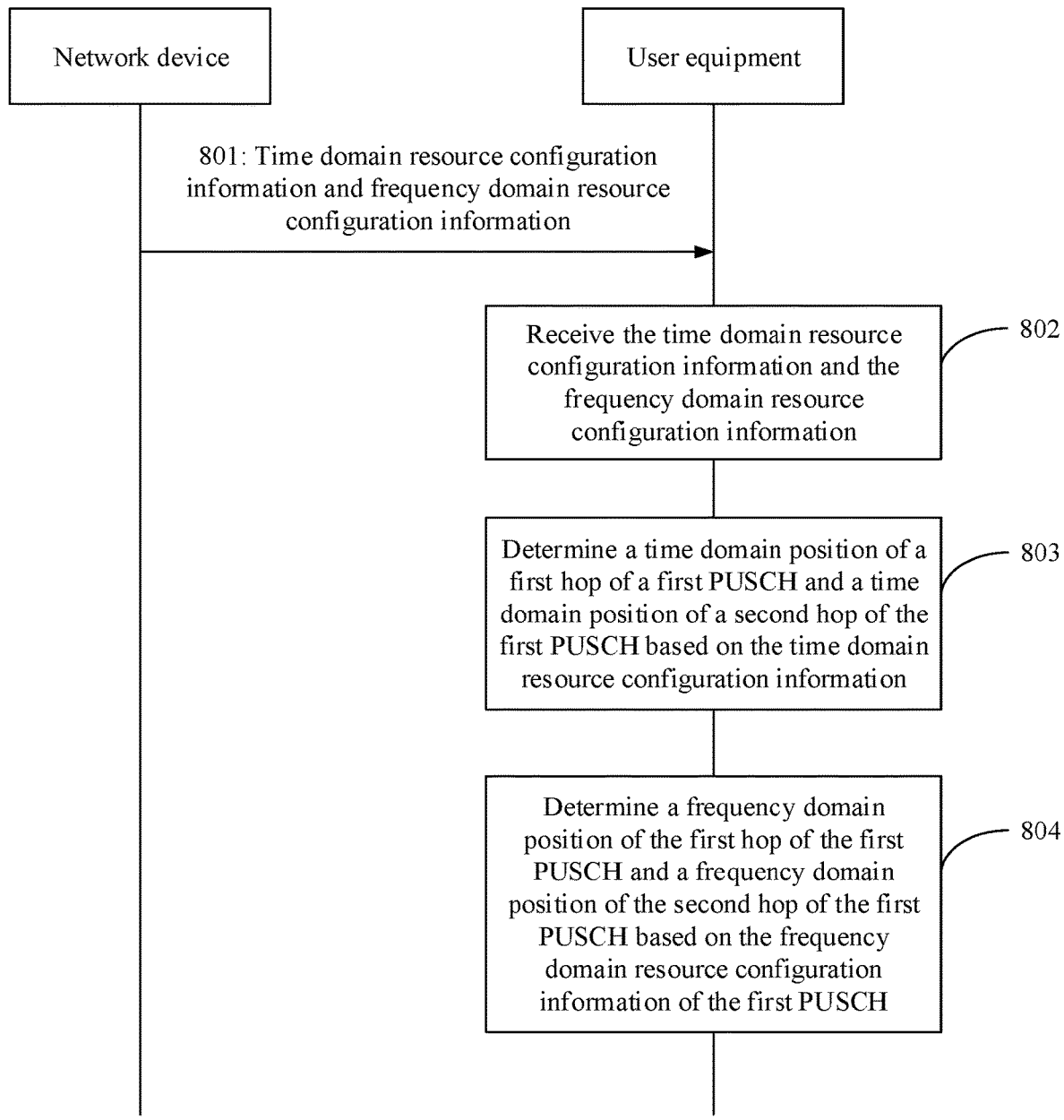
FIG. 8(*a*) is a schematic flowchart 1 of a method for determining a resource of an asynchronous PUSCH according to an embodiment of this application.
Figures 1, 8B:
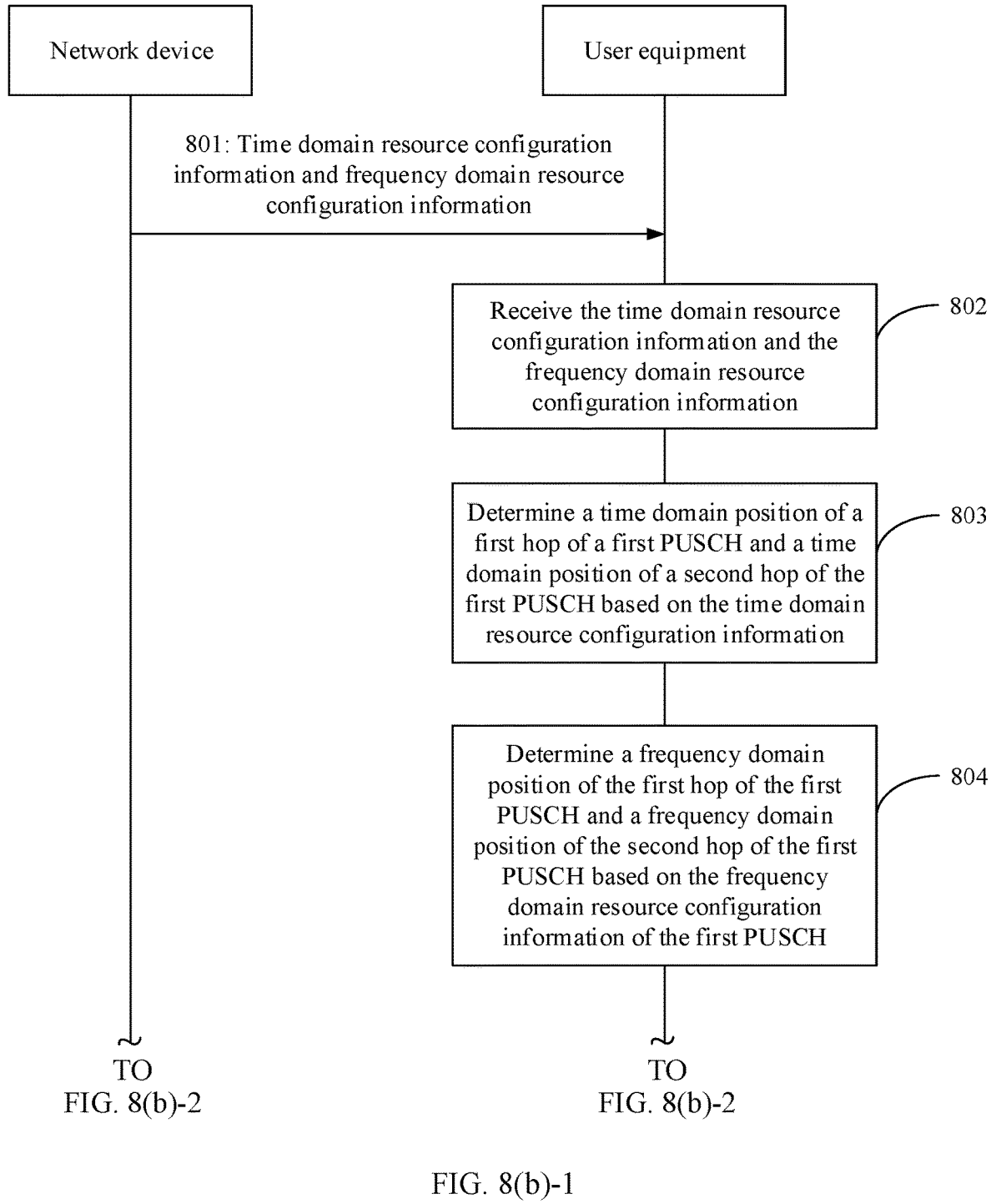
Figures 2, 8B:
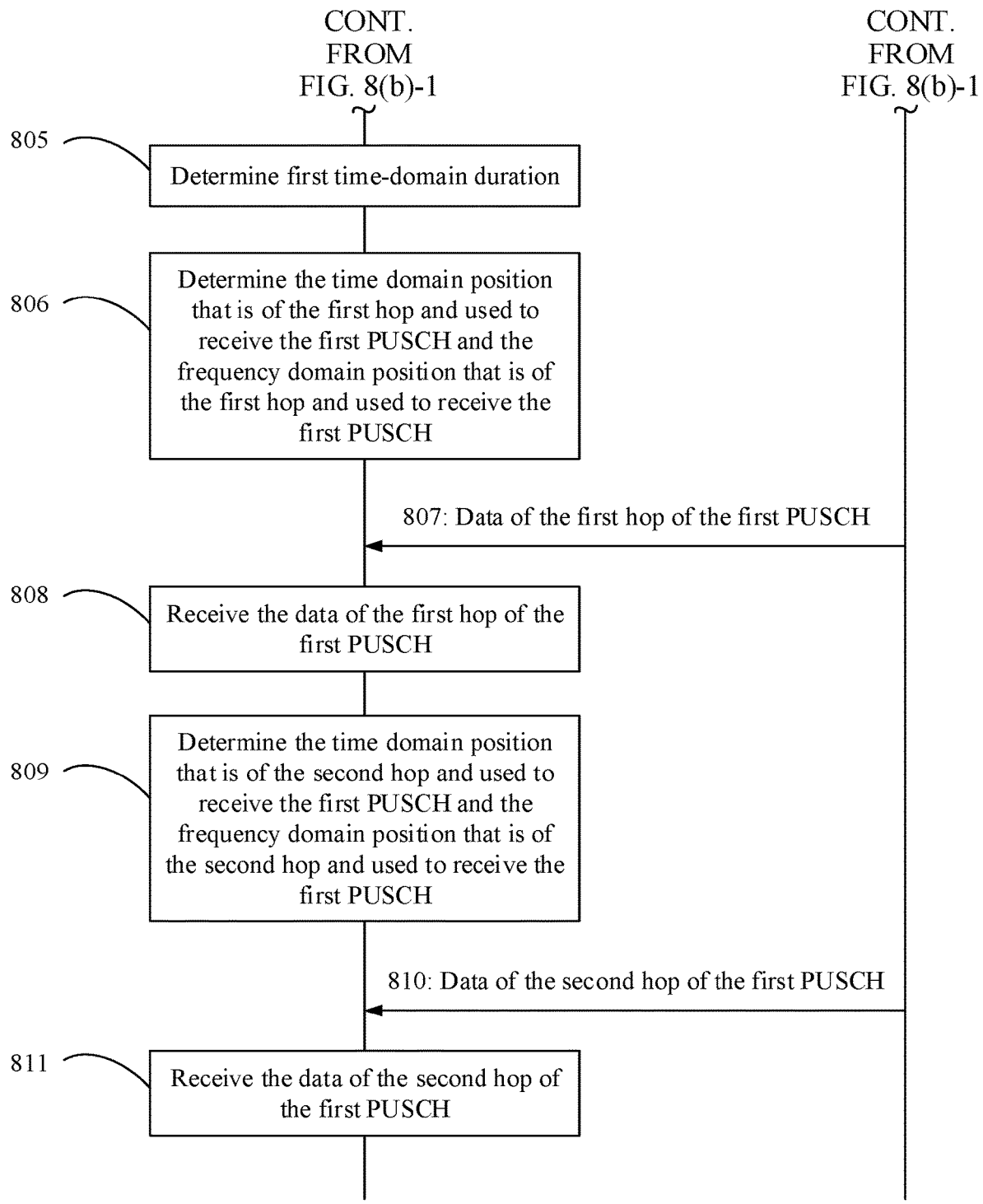

FIG. 8(*a*) shows a method for determining a resource of an asynchronous PUSCH according to an embodiment of this application. The method may include step 801 to step 804.

Step 801: A network device sends time domain resource configuration information and frequency domain resource configuration information to user equipment.

The network device may be the network device 10 shown in FIG. 1, and the user equipment may be one or more of the user equipment 20 to the user equipment 40 shown in FIG. 1.

The time domain resource configuration information may include time domain resource configuration information of a first PUSCH, and the time domain resource configuration information of the first PUSCH includes information used to determine a time-domain start position of the first PUSCH and information used to determine time-domain duration of the first PUSCH.

For example, the time-domain start position of the first PUSCH may be an index of a start symbol of the first PUSCH, and the time-domain duration of the first PUSCH may be a symbol length of the first PUSCH.

For example, the information used to determine the time-domain start position of the first PUSCH may include the time-domain start position of the first PUSCH.

For example, the information used to determine the time-domain duration of the first PUSCH may include the time-domain duration of the first PUSCH.

For example, the information used to determine the time-domain start position of the first PUSCH may include a time interval between a time domain position of another PUSCH and a time domain position of the first PUSCH. For example, the information used to determine the time-domain start position of the first PUSCH may include a time interval between a time-domain end position of a PUSCH located before the time domain position of the first PUSCH and the time-domain start position of the first PUSCH, or the information used to determine the time-domain start position of the first PUSCH may include a time interval between a time-domain start position of a PUSCH located before the time domain position of the first PUSCH and the time-domain start position of the first PUSCH, so that the user equipment can determine the time-domain start position of the first PUSCH based on the time-domain start position of the PUSCH located before the time domain position of the first PUSCH (or the time-domain end position of the PUSCH located before the time domain position of the first PUSCH) and the time interval between the time-domain start position of the PUSCH located before the time domain position of the first PUSCH (or the time-domain end position of the PUSCH located before the time domain position of the first PUSCH) and the time-domain start position of the first PUSCH.

For example, the information used to determine the time-domain duration of the first PUSCH may include total time-domain duration of a PUSCH resource group and a quantity of PUSCHs that are in the PUSCH resource group and multiplexed in time domain. For example, when the total time-domain duration of the PUSCH resource group is nine symbols, and three PUSCHs in the PUSCH resource group are multiplexed in time domain, the time-domain duration of the first PUSCH is 9/3=3, namely, three symbols.

The frequency domain resource configuration information may include frequency domain resource configuration information of the first PUSCH, and the frequency domain resource configuration information of the first PUSCH includes information used to determine a frequency-domain start position of the first PUSCH and information used to determine a quantity of RBs of the first PUSCH.

For example, the frequency-domain start position of the first PUSCH may be an index of a start RB of the first PUSCH. For example, the index of the start RB of the first PUSCH may be 0.

For example, the information used to determine the frequency-domain start position of the first PUSCH may include the frequency-domain start position of the first PUSCH.

For example, the information used to determine the quantity of RBs of the first PUSCH may include the quantity of RBs of the first PUSCH.

For example, the information used to determine the frequency-domain start position of the first PUSCH may include a frequency domain interval between a frequency domain position of another PUSCH and a frequency domain position of the first PUSCH. For example, the information used to determine the frequency-domain start position of the first PUSCH may include a frequency domain offset between a frequency-domain start position of a PUSCH located before the time domain position of the first PUSCH and the frequency-domain start position of the first PUSCH, or the information used to determine the frequency-domain start position of the first PUSCH may include a time interval between a frequency-domain end position of a PUSCH located before the time domain position of the first PUSCH and the time-domain start position of the first PUSCH, so that the user equipment can determine the frequency-domain start position of the first PUSCH based on the frequency-domain start position of the PUSCH located before the time domain position of the first PUSCH (or the frequency-domain end position of the PUSCH located before the time domain position of the first PUSCH) and the frequency domain offset between the frequency-domain start position of the PUSCH located before the time domain position of the first PUSCH (or the frequency-domain end position of the PUSCH located before the time domain position of the first PUSCH) and the frequency-domain start position of the first PUSCH.

For example, the information used to determine the quantity of RBs of the first PUSCH may include a total frequency-domain width of a PUSCH resource group and a quantity of PUSCHs that are in the PUSCH resource group and multiplexed in frequency domain. For example, when the total frequency-domain width of the PUSCH resource group is 10 RBs, and two PUSCHs in the PUSCH resource group are multiplexed in frequency domain, the quantity of RBs of the first PUSCH is 10/2=5, namely, five RBs.

The time-domain start position of the first PUSCH and the time-domain duration of the first PUSCH may be used to determine a time domain resource of the first PUSCH, and the time domain resource of the first PUSCH may be located in one slot.

A frequency-domain frequency hopping type of the first PUSCH may be intra-slot frequency hopping, and a time domain position of a first hop of the first PUSCH and a time domain position of a second hop of the first PUSCH are inconsecutive in time domain.

Optionally, the first PUSCH is used to carry uplink data sent by the user equipment to the network device.

Optionally, the frequency-domain frequency hopping type of the first PUSCH is predefined, or the frequency-domain frequency hopping type of the first PUSCH is configured by the network device for the user equipment. For example, the network device sends frequency-domain frequency hopping configuration information to the user equipment, where the frequency-domain frequency hopping configuration information is used to determine that the frequency-domain frequency hopping type of the first PUSCH is intra-slot frequency hopping.

Optionally, the network device periodically sends the time domain resource configuration information and the frequency domain resource configuration information to the user equipment.

For example, the network device sends the time domain resource configuration information and the frequency domain resource configuration information to the user equipment every five seconds, and the time domain resource configuration information and the frequency domain resource configuration information are used to configure a time domain resource and a frequency domain resource of a PUSCH sent by the user equipment within 5 s. For example, the network device sends configuration information of two-step random access, and the configuration information includes the time domain resource configuration information and the frequency domain resource configuration information.

Optionally, if the time domain resource configuration information and/or the frequency domain resource configuration information change/changes, the network device sends new time domain resource configuration information and frequency domain resource configuration information to the user equipment.

For example, the network device first configures a time-frequency resource corresponding to both an RB 1 and a symbol 2 to a symbol 4 for the user equipment. If the time-frequency resource is configured to be used to transmit a PUSCH with a higher priority, the network device may send new time domain resource configuration information and frequency domain resource configuration information to the user equipment, and the time domain resource configuration information and the frequency domain resource configuration information are used to configure a time-frequency resource other than the resource corresponding to both the RB 1 and the symbol 2 to the symbol 4.

Step 802: The user equipment receives the time domain resource configuration information and the frequency domain resource configuration information from the network device.

Step 803: The user equipment determines the time domain position of the first hop of the first PUSCH and the time domain position of the second hop of the first PUSCH based on the time domain resource configuration information.

Step 804: The user equipment determines a frequency domain position of the first hop of the first PUSCH and a frequency domain position of the second hop of the first PUSCH based on the frequency domain resource configuration information of the first PUSCH.

Based on the method shown in FIG. 8($a$), the user equipment may receive the time domain resource configuration information and the frequency domain resource configuration information from the network device, determine the time domain position of the first hop of the first PUSCH and the time domain position of the second hop of the first PUSCH based on the time domain resource configuration information, and determine the frequency domain position of the first hop of the first PUSCH and the frequency domain position of the second hop of the first PUSCH based on the frequency domain resource configuration information. The time domain position of the first hop of the first PUSCH and the time domain position of the second hop of the first PUSCH are inconsecutive in time domain. Therefore, a problem of inter-symbol interference caused by asynchronous transmission of PUSCHs by different user equipments through intra-slot frequency hopping may be resolved, so that user experience is improved.

Optionally, in a first implementation scenario of the embodiment shown in FIG. 8($a$), that the time domain position of the first hop of the first PUSCH and the time domain position of the second hop of the first PUSCH are inconsecutive in time domain includes: A time-domain end position of the first hop of the first PUSCH and a time-domain start position of the second hop of the first PUSCH are spaced by first time-domain duration.

The first time-domain duration may be a symbol length. For example, the time-domain end position of the first hop of the first PUSCH and the time-domain start position of the second hop of the first PUSCH are spaced by two symbols.

Figure 9A:
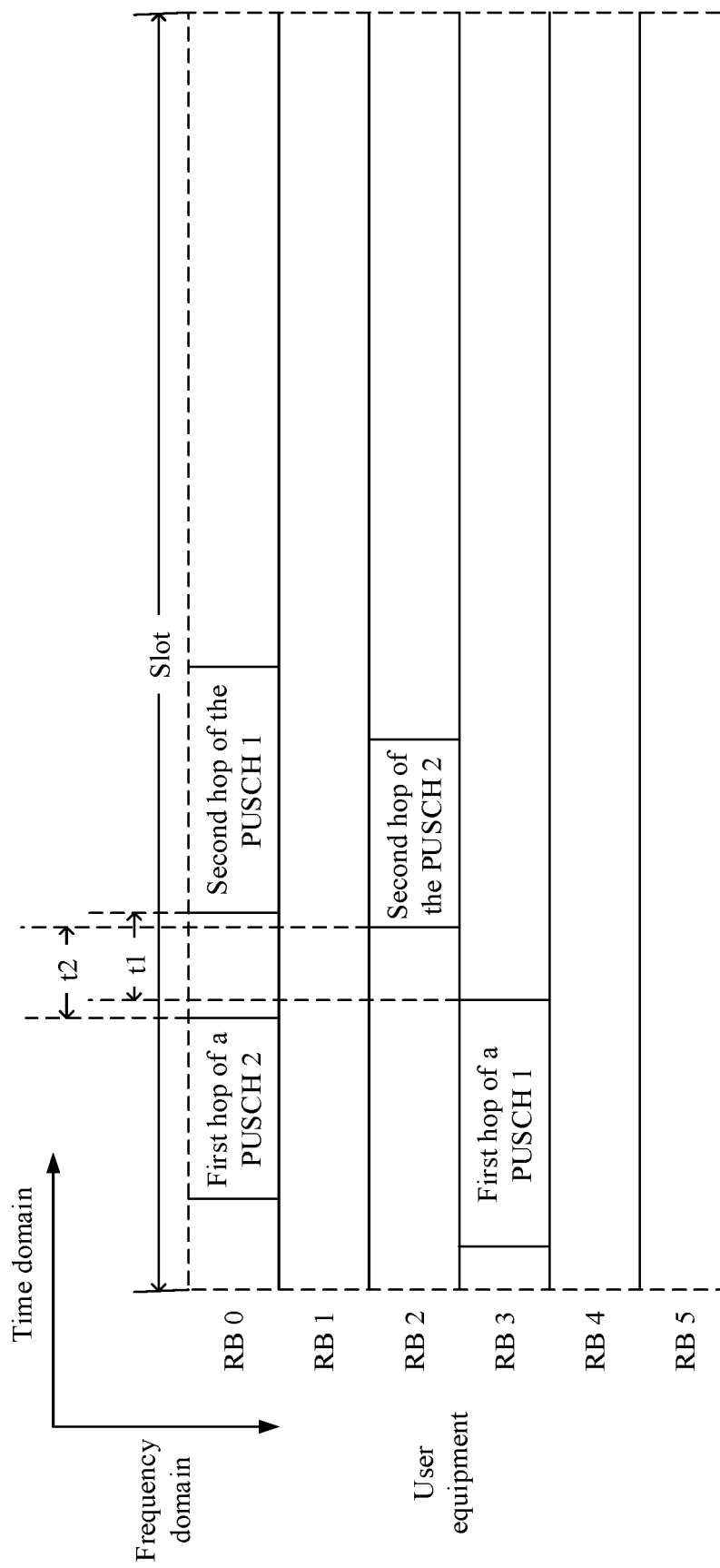
FIG. 9(*a*) is a schematic diagram 3 of a time-frequency resource of a PUSCH according to an embodiment of this application.
Figure 9B:
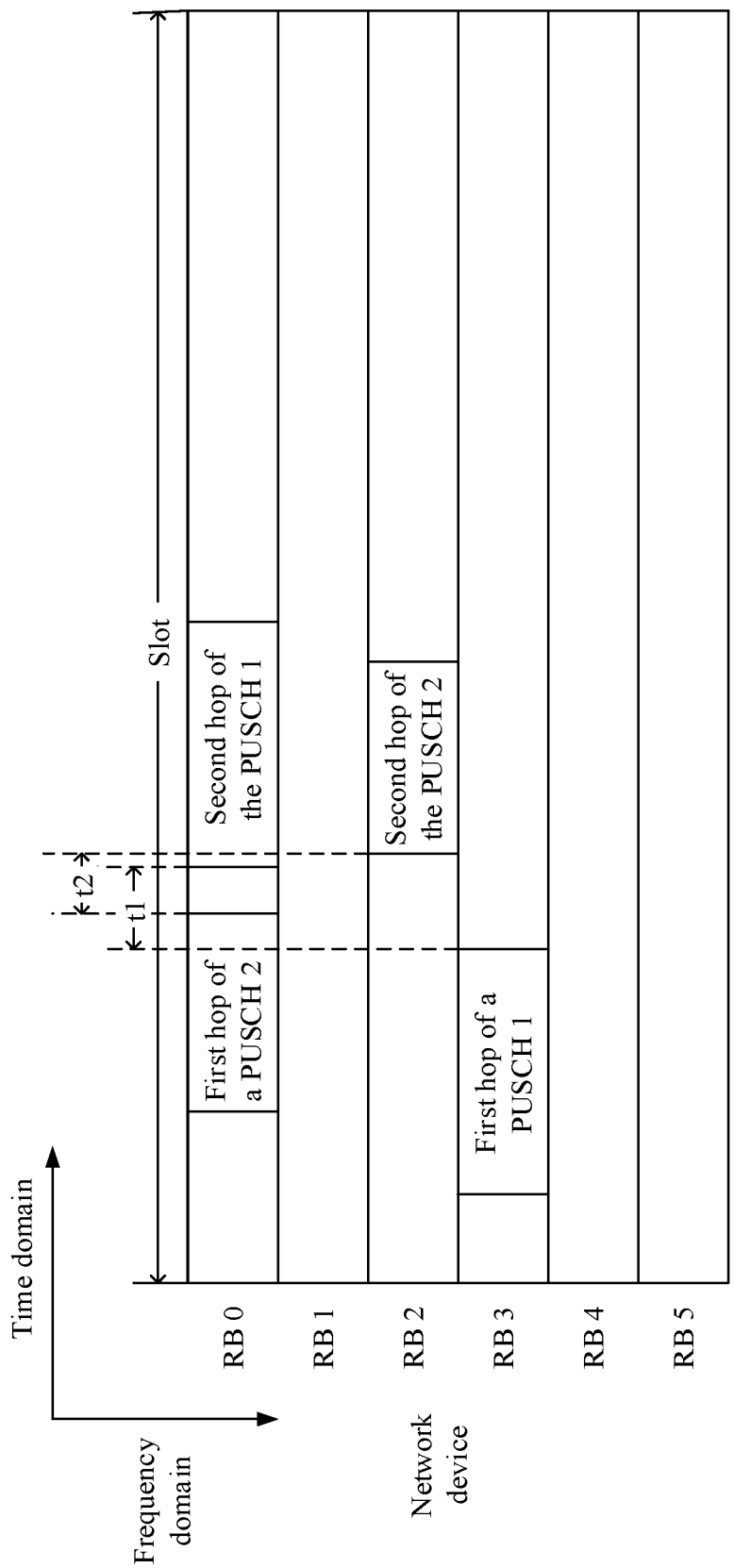

For example, as shown in FIG. 9($a$), the time-domain end position of the first hop of the PUSCH 1 in FIG. 6($a$) and the time-domain start position of the second hop of the PUSCH 1 may be spaced by t1 symbols, and the time-domain end position of the first hop of the PUSCH 2 and the time-domain start position of the second hop of the PUSCH 2 are spaced by t2 symbols. In this case, in FIG. 9(b), for an RB 0, the first hop of the PUSCH 2 and the second hop of the PUSCH 1 do not overlap in time domain, so that symbol interference between different user equipments is avoided.

Based on the first implementation scenario of the embodiment shown in FIG. 8(a), the user equipment may space the time-domain end position of the first hop of the first PUSCH and the time-domain start position of the second hop of the first PUSCH by the first time-domain duration, to avoid inter-symbol interference caused by asynchronous transmission of PUSCHs through intra-slot frequency hopping of the frequency-domain frequency hopping type, so that user experience is improved.

Optionally, in a second implementation scenario of the embodiment shown in FIG. 8(a), the first time-domain duration in the first implementation scenario of the embodiment shown in FIG. 8(a) is predefined time-domain duration, the first time-domain duration in the first implementation scenario of the embodiment shown in FIG. 8(a) is determined by the user equipment based on the time domain resource configuration information, or the first time-domain duration in the first implementation scenario of the embodiment shown in FIG. 8(a) is determined by the user equipment based on received configuration information of second time-domain duration.

Optionally, if the first time-domain duration is the predefined time-domain duration, the user equipment sets the first time-domain duration before delivery. For example, the user equipment sets the first time-domain duration to two symbols before delivery. Alternatively, it is specified in a protocol that the first time-domain duration is three symbols.

Optionally, when the first time-domain duration is determined by the user equipment based on the time domain resource configuration information, refer to the following descriptions in a third implementation scenario of the embodiment shown in FIG. 8(a) and a fourth implementation scenario of the embodiment shown in FIG. 8(a).

Optionally, that the first time-domain duration is determined by the user equipment based on received information about second time-domain duration includes: The user equipment determines the first time-domain duration according to a formula $$\left\lfloor \frac{x}{n} \right\rfloor,$$

where the information about the second time-domain duration may include information used to determine the second time-domain duration, x is the second time-domain duration, n is a positive integer, where, for example, n=2, and $\lfloor \ \rfloor$ represents a rounding down operation.

The second time-domain duration may be an interval between a time-domain end position of the first PUSCH and a time-domain start position of a second PUSCH, and a time-frequency resource of the second PUSCH is located after a time-frequency resource of the first PUSCH.

For example, the information used to determine the second time-domain duration may include the second time-domain duration.

For example, the information used to determine the second time-domain duration may include the time-domain end position of the first PUSCH and the time-domain start position of the second PUSCH.

For example, the information used to determine the second time-domain duration may include the time-domain start position of the first PUSCH, the time-domain duration of the first PUSCH, and the time-domain start position of the second PUSCH.

For example, the information that is about the second time-domain duration, configured by the network device, and received by the user equipment includes that the second time-domain duration is three symbols. In this case, the user equipment may determine that the first time-domain duration is $\lfloor 3/2 \rfloor$. That is the first time-domain duration is 1.

Based on the second implementation scenario of the embodiment shown in FIG. 8(a), the first time-domain duration may be predefined, the first length may be determined by the user equipment based on the time domain resource configuration information, or the first time-domain duration is determined by the user equipment based on the received information about the second time-domain duration, to avoid inter-symbol interference caused by asynchronous transmission of PUSCHs by different user equipments through intra-slot frequency hopping of the frequency-domain frequency hopping type, so that user experience is improved.

Optionally, in the third implementation scenario of the embodiment shown in FIG. 8(a), that the first time-domain duration is determined by the user equipment based on the time domain resource configuration information in the second implementation scenario of the embodiment shown in FIG. 8(a) includes: When the time-frequency resource of the second PUSCH that is located after the time-frequency resource of the first PUSCH does not exist in the slot, the user equipment determines the first time-domain duration based on a total quantity of symbols in the slot, the time-domain start position of the first PUSCH, and the time-domain duration of the first PUSCH.

Optionally, the time-domain start position of the first PUSCH is a time-domain start position of the first hop of the first PUSCH.

The time-domain start position of the first hop of the first PUSCH may be an index of a start symbol of the first hop of the first PUSCH.

Figure 10:
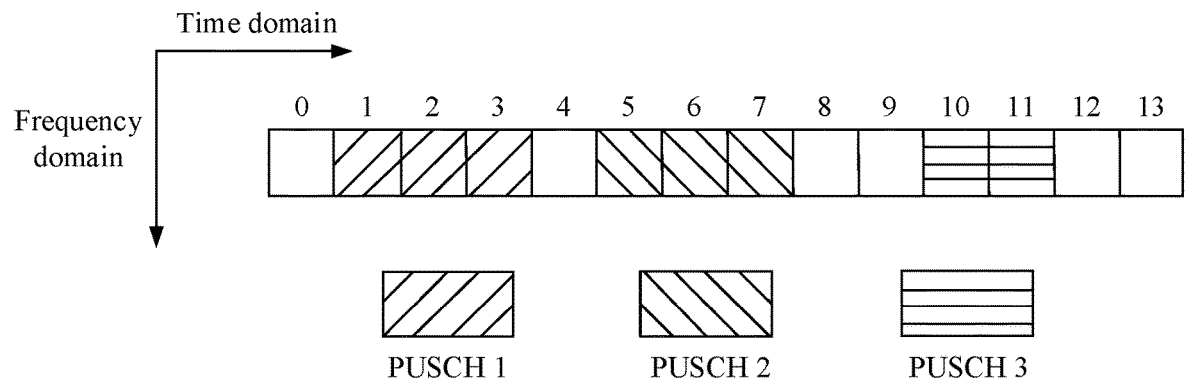
FIG. 10 is a schematic diagram 5 of a time-frequency resource of a PUSCH according to an embodiment of this application.

It should be noted that there may be time-frequency resources of one or more PUSCH in one slot, and a time-frequency resource of each PUSCH is used to send the PUSCH. As shown in FIG. 10, an example in which one slot includes 14 symbols is used for description. The slot may include a time-frequency resource of a PUSCH 1, a time-frequency resource of a PUSCH 2, and a time-frequency resource of a PUSCH 3. A symbol length of the PUSCH 1 is 3, a symbol length of the PUSCH 2 is 3, and a symbol length of the PUSCH 3 is 2.

That the time-frequency resource of the second PUSCH that is located after the time-frequency resource of the first PUSCH does not exist in the slot may include: There is only a time-frequency resource of one PUSCH in the slot, where, for example, there is only the time-frequency resource of the first PUSCH in the slot. Alternatively, there are time-frequency resources of a plurality of PUSCHs in the slot, and the time-frequency resource of the first PUSCH is a time-frequency resource of the last PUSCH in the slot.

For example, when the time-frequency resource of the second PUSCH that is located after the time-frequency resource of the first PUSCH does not exist in the slot, the user equipment determines the first time-domain duration according to a formula $$\left\lfloor \frac{N_{symb}^{slot} - S_{start}^{j} - N_{symb}^{PUSCH,s}}{m} \right\rfloor,$$

where $S_{start}^{j}$ is the time-domain start position of the first hop of the first PUSCH, $N_{symb}^{PUSCH,s}$ is the time-domain duration of the first PUSCH, $N_{symb}^{slot}$ is the total quantity of symbols in the slot, m is a positive integer, where preferably, m=2, and $\lfloor \; \rfloor$ represents a rounding down operation.

Optionally, a value of m corresponds to an intra-slot frequency hopping mode of the first PUSCH. For example, when the intra-slot frequency hopping mode of the first PUSCH is a two-hop mode, m=2; when the intra-slot frequency hopping mode of the first PUSCH is a three-hop mode, m=3.

It should be noted that, $N_{symb}^{slot} - S_{start}^{j} - N_{symb}^{PUSCH,s}$ may be used to represent a guard time interval reserved by the network device for the first PUSCH.

Based on the third implementation scenario of the embodiment shown in FIG. 8(a), when the time-frequency resource of the second PUSCH that is located after the time-frequency resource of the first PUSCH does not exist in the slot, the user equipment may determine the first time-domain duration according to the formula $$\left\lfloor \frac{N_{symb}^{slot} - S_{start}^{j} - N_{symb}^{PUSCH,s}}{m} \right\rfloor.$$

Optionally, in the fourth implementation scenario of the embodiment shown in FIG. 8(a), that the first time-domain duration is determined by the user equipment based on the time domain resource configuration information in the second implementation scenario of the embodiment shown in FIG. 8(a) includes: When the time-frequency resource of the second PUSCH that is located after the time-frequency resource of the first PUSCH exists in the slot, the user equipment determines the first time-domain duration based on the time-domain start position of the second PUSCH, the time-domain start position of the first PUSCH, and the time-domain duration of the first PUSCH.

The time-domain start position of the first PUSCH may be an index of a start symbol of the first PUSCH, and the time-domain duration of the first PUSCH may be a symbol length of the first PUSCH.

Optionally, the time-domain start position of the first PUSCH is a time-domain start position of the first hop of the first PUSCH.

The time-domain start position of the first hop of the first PUSCH may be an index of a start symbol of the first hop of the first PUSCH.

It should be noted that there may be time-frequency resources of one or more PUSCH in one slot, and a time-frequency resource of each PUSCH is used to send the PUSCH. In the fourth implementation scenario of the embodiment shown in FIG. 8(a), there are time-frequency resources of at least two PUSCHs in the slot. For example, the time-frequency resource of the first PUSCH and the time-frequency resource of the second PUSCH exist in the slot. The time-frequency resource of the second PUSCH is located after the time-frequency resource of the first PUSCH, and there is no time-frequency resource of another PUSCH between the time-frequency resource of the second PUSCH and the time-frequency resource of the first PUSCH.

It should be noted that another time-frequency resource may further exist in the slot, where, for example, a time-frequency resource before the time-frequency resource of the first PUSCH may further exist in the slot, a time-frequency resource after the time-frequency resource of the second PUSCH may further exist in the slot, or a time-frequency resource before the time-frequency resource of the first PUSCH and a time-frequency resource after the time-frequency resource of the second PUSCH may further exist in the slot.

Optionally, the time domain resource configuration information in the method shown in FIG. 8(a) may further include information used to determine the time-domain start position of the second PUSCH, and the time-domain start position of the second PUSCH may be an index of a start symbol of the second PUSCH.

For specific descriptions of the information used to determine the time-domain start position of the second PUSCH, refer to the descriptions of the information used to determine the time-domain start position of the first PUSCH in step 801. Details are not described herein again.

Optionally, the user equipment determines the first time-domain duration according to a formula $$\left\lfloor \frac{S_{start}^{j+1} - S_{start}^{j} - N_{symb}^{PUSCH,s}}{m} \right\rfloor,$$

where $S_{start}^{j}$ it is the time-domain start position of the first hop of the first PUSCH, $N_{symb}^{PUSCH,s}$ is the time-domain duration of the first PUSCH, $S_{start}^{j+1}$ is the time-domain start position of the second PUSCH, m is a positive integer, where preferably, m=2, and $\lfloor \; \rfloor$ represents a rounding down operation.

Optionally, a value of m corresponds to an intra-slot frequency hopping mode of the first PUSCH. For example, when the intra-slot frequency hopping mode of the first PUSCH is a two-hop mode, m=2; when the intra-slot frequency hopping mode of the first PUSCH is a three-hop mode, m=3.

It should be noted that, $S_{start}^{j+1} - S_{start}^{j} - N_{symb}^{PUSCH,s}$ may be used to represent a guard time interval reserved by the network device for the first PUSCH.

Based on the fourth implementation scenario of the embodiment shown in FIG. 8(a), when the time-frequency resource of the second PUSCH that is located after the time-frequency resource of the first PUSCH exists in the slot, the user equipment may determine the first time-domain duration according to the formula $$\left\lfloor \frac{S_{start}^{j+1} - S_{start}^{j} - N_{symb}^{PUSCH,s}}{m} \right\rfloor.$$

Optionally, in a fifth implementation scenario of the embodiment shown in FIG. 8(a), that the user equipment determines the time domain position of the first hop of the first PUSCH and the time domain position of the second hop of the first PUSCH based on the time domain resource configuration information includes: The user equipment determines that the time-domain start position of the first PUSCH is the time-domain start position of the first hop of the first PUSCH, determines time-domain duration of the first hop of the first PUSCH based on the time-domain duration of the first PUSCH, and sums up the time-domain start position of the first PUSCH, the time-domain duration of the first hop of the first PUSCH, and the first time-domain duration, to obtain the time-domain start position of the second hop of the first PUSCH.

Optionally, that the user equipment determines time-domain duration of the first hop of the first PUSCH based on the time-domain duration of the first PUSCH includes: The user equipment determines the time-domain duration of the first hop of the first PUSCH according to a formula $$\left\lfloor \frac{N_{symb}^{PUSCH,s}}{l} \right\rfloor,$$

where
$N_{symb}^{PUSCH,s}$ is the time-domain duration of the first PUSCH, l is a positive integer, where preferably, l=2, and $\lfloor \ \rfloor$ represents a rounding down operation.

Optionally, a value of l corresponds to an intra-slot frequency hopping mode of the first PUSCH. For example, when the intra-slot frequency hopping mode of the first PUSCH is a two-hop mode, l=2; when the intra-slot frequency hopping mode of the first PUSCH is a three-hop mode, l=3.

That the time-domain duration of the first PUSCH is 3 and l=2 is used as an example for description. The time-domain duration of the first hop of the first PUSCH is $\lfloor 3/2 \rfloor$. That is, the time-domain duration of the first hop of the first PUSCH is 1.

Optionally, the user equipment determines time-domain duration of the second hop of the first PUSCH according to a formula $$N_{symb}^{PUSCH,s} - \left\lfloor \frac{N_{symb}^{PUSCH,s}}{l} \right\rfloor.$$

That the time-domain duration of the first PUSCH is 3 and l=2 is used as an example for description. The time-domain duration of the second hop of the first PUSCH is 3-$\lfloor 3/2 \rfloor$. That is, the time-domain duration of the second hop of the first PUSCH is 2.

Optionally, when the time-frequency resource of the second PUSCH that is located after the time-frequency resource of the first PUSCH does not exist in the slot, that the user equipment sums up the time-domain start position of the first PUSCH, the time-domain duration of the first hop of the first PUSCH, and the first time-domain duration, to obtain the time-domain start position of the second hop of the first PUSCH includes: The user equipment determines the time-domain start position of the second hop of the first PUSCH according to a formula $$S_{start}^{j} + \left\lfloor \frac{N_{symb}^{PUSCH,s}}{l} \right\rfloor + \left\lfloor \frac{N_{symb}^{slot} - S_{start}^{j} - N_{symb}^{PUSCH,s}}{m} \right\rfloor.$$

For example, when the time-frequency resource of the second PUSCH that is located after the time-frequency resource of the first PUSCH does not exist in the slot, an example in which $S_{start}^{j}=2$, $N_{symb}^{PUSCH,s}=3$, l=2, $N_{symb}^{slot}=14$, and m=2 is used for description. The time-domain start position of the second hop of the first PUSCH may be $$2 + \left\lfloor \frac{3}{2} \right\rfloor + \left\lfloor \frac{14-2-3}{2} \right\rfloor.$$

In other words, the time-domain start position of the second hop of the first PUSCH may be a symbol 7 in the slot.

Optionally, when the time-frequency resource of the second PUSCH that is located after the time-frequency resource of the first PUSCH exists in the slot, that the user equipment sums up the time-domain start position of the first PUSCH, the time-domain duration of the first hop of the first PUSCH, and the first time-domain duration, to obtain the time-domain start position of the second hop of the first PUSCH includes: The user equipment determines the time-domain start position of the second hop of the first PUSCH according to a formula $$S_{start}^{j} + \left\lfloor \frac{N_{symb}^{PUSCH,s}}{l} \right\rfloor + \left\lfloor \frac{S_{start}^{j+1} - S_{start}^{j} - N_{symb}^{PUSCH,s}}{m} \right\rfloor.$$

For example, when the time-frequency resource of the second PUSCH that is located after the time-frequency resource of the first PUSCH exists in the slot, an example in which $S_{start}^{j}=2$, $N_{symb}^{PUSCH,s}=3$, l=2, $S_{start}^{j+1}=10$, and m=2 is used for description. The time-domain start position of the second hop of the first PUSCH may be $$2 + \left\lfloor \frac{3}{2} \right\rfloor + \left\lfloor \frac{10-2-3}{2} \right\rfloor.$$

In other words, the time-domain start position of the second hop of the first PUSCH may be a symbol 5 in the slot.

Based on the fifth implementation scenario of the embodiment shown in FIG. 8(a), the user equipment may determine that the time-domain start position of the first PUSCH is the time-domain start position of the first hop of the first PUSCH, determine the time-domain duration of the first hop of the first PUSCH based on the time-domain duration of the first PUSCH, and further sum up the time-domain start position of the first PUSCH, the time-domain duration of the first hop of the first PUSCH, and the first time-domain duration, to obtain the time-domain start position of the second hop of the first PUSCH.

Optionally, in a sixth implementation scenario of the embodiment shown in FIG. 8(a), the frequency domain resource configuration information further includes configuration information of a frequency domain offset. That the user equipment determines a frequency domain position of the first hop of the first PUSCH and a frequency domain position of the second hop of the first PUSCH based on the frequency domain resource configuration information of the first PUSCH includes: The user equipment determines a frequency-domain start position of the first hop of the first PUSCH based on the frequency domain resource configuration information of the first PUSCH, and determines a frequency-domain start position of the second hop of the first PUSCH based on the frequency-domain start position of the first hop of the first PUSCH, the frequency domain offset, and a total quantity of resource blocks.

The configuration information of the frequency domain offset may be used to indicate the frequency domain offset.

The frequency domain offset may be an offset between the frequency-domain start position of the first hop of the first PUSCH and the frequency-domain start position of the second hop of the first PUSCH. In a possible design, the configuration information of the frequency domain offset includes the frequency domain offset, and the frequency domain offset is pre-configured.

In another possible design, the configuration information of the frequency domain offset includes information used to determine the frequency domain offset, and the user equipment determines the frequency domain offset based on a correspondence among the total quantity of resource blocks, the information used to determine the frequency domain offset, and the frequency domain offset.

The information used to determine the frequency domain offset may be $N_{UL, hop}$ or the like.

For related descriptions of the total quantity of resource blocks, refer to the descriptions in the following seventh implementation scenario of the embodiment shown in FIG. 8(a).

For example, Table 1 shows the correspondence among the total quantity of resource blocks, the configuration information of the frequency domain offset, and the frequency domain offset. N is the total quantity of resource blocks. When N<50, and $N_{UL, hop}$ is 0, the frequency domain offset may be $\lfloor N/2 \rfloor$. When N<50, and $N_{UL, hop}$ is 1, the frequency domain offset may be $\lfloor N/4 \rfloor$. When N≥50, and $N_{UL, hop}$ is 00, the frequency domain offset may be $\lfloor N/2 \rfloor$. When N≥50, and $N_{UL, hop}$ is 01, the frequency domain offset may be $\lfloor N/4 \rfloor$. When N≥50, and $N_{UL, hop}$ is 10, the frequency domain offset may be $-\lfloor N/4 \rfloor$. When N≥50, and $N_{UL, hop}$ is 11, the frequency domain offset may be a predefined frequency domain offset.

It should be noted that Table 1 is merely an example of the correspondence among the total quantity of resource blocks, the configuration information of the frequency domain offset, and the frequency domain offset. The correspondence among the total quantity of resource blocks, the configuration information of the frequency domain offset, and the frequency domain offset may alternatively be in another form. This is not limited.

TABLE 1

| Total quantity of resource blocks | $N_{UL, hop}$ | Frequency domain offset |
|---|---|---|
| N < 50 | 0 | $\lfloor N/2 \rfloor$ |
|  | 1 | $\lfloor N/4 \rfloor$ |
| N ≥ 50 | 00 | $\lfloor N/2 \rfloor$ |
|  | 01 | $\lfloor N/4 \rfloor$ |
|  | 10 | $-\lfloor N/4 \rfloor$ |
|  | 11 | Predefined |

Optionally, that the user equipment determines a frequency-domain start position of the first hop of the first PUSCH based on the frequency domain resource configuration information of the first PUSCH includes: The user equipment determines that the frequency-domain start position of the first PUSCH is the frequency-domain start position of the first hop of the first PUSCH.

For example, the frequency-domain start position of the first PUSCH is the RB 1. In this case, the frequency-domain start position of the first hop of the first PUSCH is also the RB 1.

Optionally, that the user equipment determines a frequency-domain start position of the second hop of the first PUSCH based on the frequency-domain start position of the first hop of the first PUSCH, the frequency domain offset, and a total quantity of resource blocks includes: The user equipment determines the frequency-domain start position of the second hop of the first PUSCH according to a formula $(RB_{start}+RB_{offset}) \bmod N$, where $RB_{start}$ is the frequency-domain start position of the first hop of the first PUSCH, $RB_{offset}$ is the frequency domain offset, N is the total quantity of resource blocks, and mod is a modulo operator.

For example, $RB_{start}=15$, $RB_{offset}=6$, and N=20. An index of a start RB of the second hop of the first PUSCH may be (15+6) mod 20=1. To be specific, an index of a start RB of the first hop of the first PUSCH is 15, and the index of the start RB of the second hop of the first PUSCH is 1.

For example, $RB_{start}=15$, $N_{UL, hop}=0$, and N=20. $RB_{offset}=\lfloor N/2 \rfloor$ may be determined according to Table 1. That is, $RB_{offset}=10$. The index of the start RB of the second hop of the first PUSCH may be (15+10) mod 20=5. To be specific, the index of the start RB of the first hop of the first PUSCH is 15, and the index of the start RB of the second hop of the first PUSCH is 5.

Further, a quantity of RBs of the first hop and a quantity of RBs of the second hop may be determined.

Optionally, the user equipment determines that the quantity of RBs of the first PUSCH is the quantity of RBs of the first hop of the first PUSCH, and the user equipment determines that the quantity of RB s of the first PUSCH is the quantity of RB s of the second hop of the first PUSCH.

Based on the sixth implementation scenario of the embodiment shown in FIG. 8(a), the user equipment may determine the frequency-domain start position of the first hop of the first PUSCH based on the frequency domain resource configuration information of the first PUSCH, and determine the frequency-domain start position of the second hop of the first PUSCH based on the frequency-domain start position of the first hop of the first PUSCH, the frequency domain offset, and the total quantity of resource blocks.

Optionally, in the seventh implementation scenario of the embodiment shown in FIG. 8(a), the total quantity of resource blocks includes a quantity of resource blocks in an uplink bandwidth part (BWP), the total quantity of resource blocks includes a quantity of resource blocks in an uplink bandwidth part BWP in which the first PUSCH is located, the total quantity of resource blocks includes a quantity of resource blocks in an uplink bandwidth part BWP in which a physical random access channel PRACH associated with the first PUSCH is located, the total quantity of resource blocks includes a quantity of resource blocks in a time-frequency resource of a PRACH associated with the first PUSCH, or the total quantity of resource blocks includes a quantity of resource blocks in a time-frequency resource group of a PRACH associated with the first PUSCH.

The uplink BWP may include an active uplink BWP.

Optionally, the active uplink BWP may include the time-frequency resource of the first PUSCH and a plurality of time-frequency resources of the PRACH. The time-frequency resource of the first PUSCH may be associated with one or more time-frequency resources of the PRACH. The plurality of time-frequency resources of the PRACH may be referred to as the time-frequency resource group of the PRACH.

Figure 11:
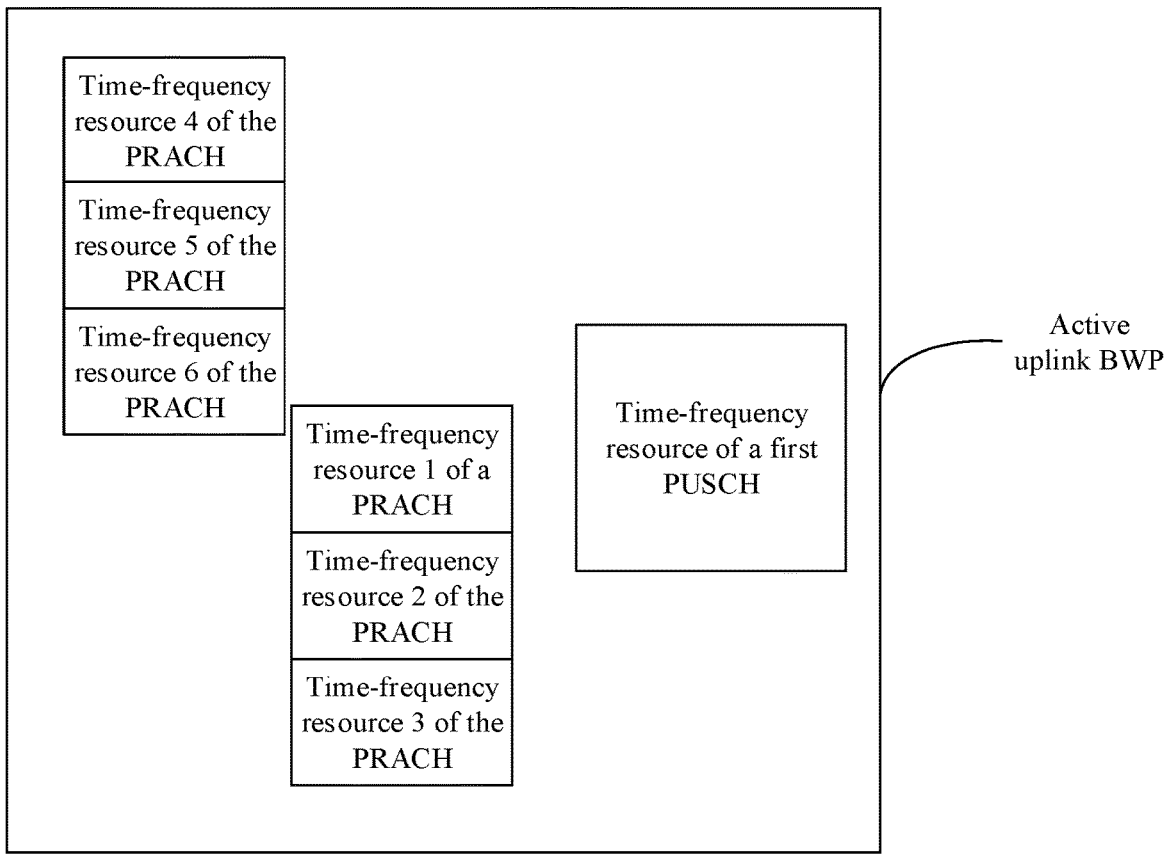
FIG. 11 is a schematic diagram of a resource pool according to an embodiment of this application.

FIG. 11 is a schematic diagram of a resource pool. In FIG. 11, the time-frequency resource of the first PUSCH may be associated with one or more of time-frequency resources 1 to 6 of the PRACH. The time-frequency resources 1 to 3 of the PRACH or the time-frequency resource 4 to 6 of the PRACH may become a time-frequency resource group of the PRACH.

FIG. 11 is used as an example. The total quantity of resource blocks may include a quantity of resource blocks in the active uplink BWP. Alternatively, if the first PUSCH is associated with the time-frequency resource 1 of the PRACH, the total quantity of resource blocks may include a quantity of resource blocks in the time-frequency resource 1 of the PRACH. Alternatively, if the first PUSCH is associated with the time-frequency resources 1 to 3 of the PRACH, the total quantity of resource blocks may include a sum of a quantity of resource blocks in the time-frequency resource 1 of the PRACH, a quantity of resource blocks in the time-frequency resource 2 of the PRACH, and a quantity of resource blocks in the time-frequency resource 3 of the PRACH.

Based on the seventh implementation scenario of the embodiment shown in FIG. 8(a), the user equipment may determine the total quantity of resource blocks based on the quantity of resource blocks in the active uplink BWP, the quantity of resource blocks in the uplink bandwidth part BWP in which the first PUSCH is located, the quantity of resource blocks in the uplink bandwidth part BWP in which the PRACH associated with the first PUSCH is located, the quantity of resource blocks in the time-frequency resource of the PRACH associated with the first PUSCH, or the quantity of resource blocks in the time-frequency resource group of the PRACH associated with the first PUSCH.

Optionally, in an eighth implementation scenario of the embodiment shown in FIG. 8(a), after determining a time-frequency resource of the first hop of the first PUSCH and a time-frequency resource of the second hop of the first PUSCH, the user equipment may send data of the first hop of the first PUSCH and data of the second hop of the first PUSCH. As shown in FIG. 8(b)-1 and FIG. 8(b)-2, the method shown in FIG. 8(a) further includes step 805 to step 811.

Step 805: The network device determines first time-domain duration.

Optionally, the first time-domain duration is predefined time-domain duration, the first time-domain duration is determined by the network device based on information that is about second time-domain duration and sent to the user equipment, or the first time-domain duration is determined by the network device based on the time domain resource configuration information sent to the user equipment.

The second time-domain duration is an interval between a time-domain end position of the first PUSCH and a time-domain start position of a second PUSCH, and a time-frequency resource of the second PUSCH is located after a time-frequency resource of the first PUSCH.

For specific descriptions of a case in which the first time-domain duration is the predefined time-domain duration or the first time-domain duration is determined by the network device based on the information that is about the second time-domain duration and sent to the user equipment, refer to related descriptions of determining the first time-domain duration by the user equipment in the forego-ing second implementation scenario of the embodiment shown in FIG. 8(a). Details are not described herein again.

For specific descriptions of a case in which the first time-domain duration is determined by the network device based on the time domain resource configuration information sent to the user equipment, refer to related descriptions of determining the first time-domain duration by the user equipment in the foregoing third implementation scenario and fourth implementation scenario of the embodiment shown in FIG. 8(a). Details are not described herein again.

Step 806: The network device determines the time domain position that is of the first hop and used to receive the first PUSCH and the frequency domain position that is of the first hop and used to receive the first PUSCH.

The network device may determine, based on the time domain resource configuration information, the time domain position that is of the first hop and used to receive the first PUSCH, and may determine, based on the frequency domain resource configuration information of the first PUSCH, the frequency domain position that is of the first hop and used to receive the first PUSCH. In this application, the network device determines a time domain position used to receive a PUSCH. That is, the network device determines a time domain resource in which the PUSCH is located. The network device determines a frequency domain position used to receive the PUSCH. That is, the network device determines a frequency domain resource in which the PUSCH is located. The network device receives signals carried on the determined time domain resource and frequency domain resource in which the PUSCH is located, to restore data transmitted on the PUSCH. It may be understood that, based on same time domain resource configuration information and frequency domain resource configuration information, the time domain resource and the frequency domain resource that are determined by the network device and used to receive the PUSCH are the same as a time domain resource and a frequency domain resource that are of the PUSCH and determined by the user equipment. The time domain resource and the frequency domain resource that are of the PUSCH and determined by the user equipment may also be referred to as a time domain resource and a frequency domain resource that are used to send the PUSCH.

For a specific process in which the network device determines, based on the time domain resource configuration information, the time domain position that is of the first hop and used to receive the first PUSCH, refer to the descriptions of determining the time domain position of the first hop of the first PUSCH by the user equipment in the fifth implementation scenario of the embodiment shown in FIG. 8(a). Details are not described herein again.

For a specific process in which the network device determines, based on the frequency domain resource configuration information of the first PUSCH, the frequency domain position that is of the first hop and used to receive the first PUSCH, refer to the descriptions of determining the frequency domain position of the first hop of the first PUSCH by the user equipment in the sixth implementation scenario of the embodiment shown in FIG. 8(a). Details are not described herein again.

Step 807: The user equipment sends the data of the first hop of the first PUSCH to the network device at the determined time domain position of the first hop of the first PUSCH and the determined frequency domain position of the first hop of the first PUSCH.

The data of the first hop of the first PUSCH may be a part of uplink data to be sent by the user equipment.

Step 808: The network device receives the data of the first hop of the first PUSCH from the user equipment at the determined time domain position that is of the first hop and used to receive the first PUSCH and the determined frequency domain position that is of the first hop and used to receive the first PUSCH.

Step 809: The network device determines the time domain position that is of the second hop and used to receive the first PUSCH and the frequency domain position that is of the second hop and used to receive the first PUSCH.

The network device may determine, based on the time domain resource configuration information, the time domain position that is of the second hop and used to receive the first PUSCH, and may determine, based on the frequency domain resource configuration information of the first PUSCH, the frequency domain position that is of the second hop and used to receive the first PUSCH.

For a specific process in which the network device determines, based on the time domain resource configuration information, the time domain position that is of the second hop and used to receive the first PUSCH, refer to the description of determining the time domain position of the second hop of the first PUSCH by the user equipment in the fifth implementation scenario of the embodiment shown in FIG. 8(*a*). Details are not described herein again.

For a specific process in which the network device determines, based on the frequency domain resource configuration information of the first PUSCH, the frequency domain position that is of the second hop and used to receive the first PUSCH, refer to the descriptions of determining the frequency domain position of the second hop of the first PUSCH by the user equipment in the sixth implementation scenario of the embodiment shown in FIG. 8(*a*). Details are not described herein again.

Step 810: The user equipment sends the data of the second hop of the first PUSCH to the network device at the determined time domain position of the second hop of the first PUSCH and the determined frequency domain position of the second hop of the first PUSCH.

The data of the second hop of the first PUSCH may be another part of the uplink data to be sent by the user equipment.

Step 811: The network device starts to receive the data of the second hop of the first PUSCH from the user equipment at the determined time domain position that is of the second hop and used to receive the first PUSCH and the determined frequency domain position that is of the second hop and used to receive the first PUSCH.

Optionally, after receiving the data of the first hop of the first PUSCH and the data of the second hop of the first PUSCH, the network device sends a response message to the user equipment. The response message is used to indicate that the network device has received the data of the first hop of the first PUSCH and the data of the second hop of the first PUSCH.

Based on the eighth implementation scenario of the embodiment shown in FIG. 8(*a*), the user equipment may send the data of the first hop of the first PUSCH at the determined time domain position of the first hop of the first PUSCH and the determined frequency domain position of the first hop of the first PUSCH, and send the data of the second hop of the first PUSCH at the determined time domain position of the second hop of the first PUSCH and the determined frequency domain position of the second hop of the first PUSCH. The network device may start to receive the data of the first hop of the first PUSCH from the user equipment at the determined time domain position that is of the first hop and used to receive the first PUSCH and the determined frequency domain position that is of the first hop and used to receive the first PUSCH, and start to receive the data of the second hop of the first PUSCH from the user equipment at the determined time domain position that is of the second hop and used to receive the first PUSCH and the determined frequency domain position that is of the second hop and used to receive the first PUSCH.

The embodiment shown in FIG. 8(*a*) and various implementation scenarios included in the embodiment are a method used by the user equipment to determine the first time-domain duration based on the time domain resource configuration information and the frequency domain resource configuration information that are sent by the network device, to determine a resource of an asynchronous PUSCH. The network device may further send the first time-domain duration to the user equipment, so that the user equipment determines the resource of the asynchronous PUSCH based on the first time-domain duration sent by the network device. The following describes a method for determining a resource of an asynchronous PUSCH by user equipment based on first time-domain duration sent by a network device. For a specific process of the method, refer to the method shown in FIG. 12(*a*).

Figure 12A:
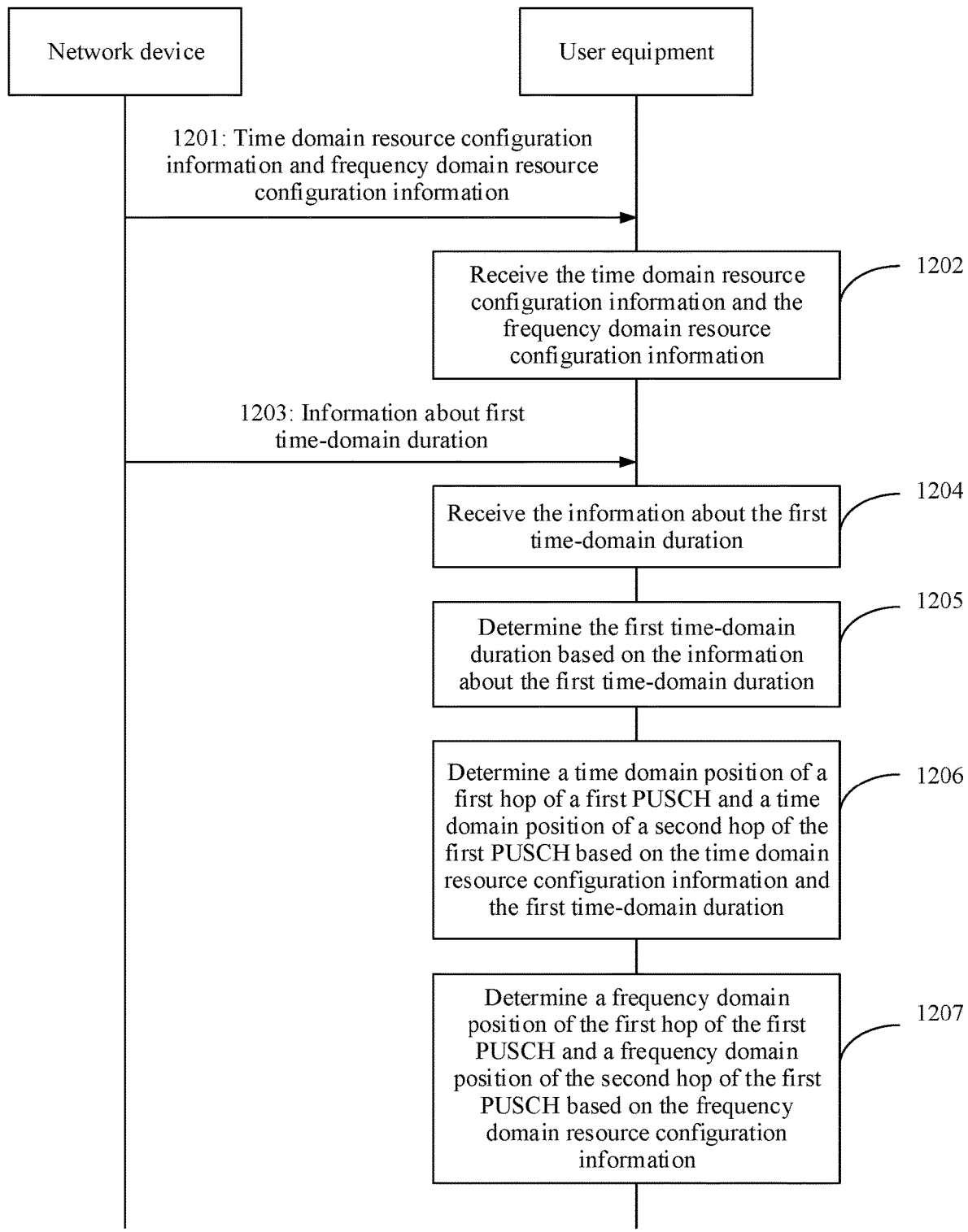
FIG. 12(a) is a schematic flowchart 3 of a method for determining a resource of an asynchronous PUSCH according to an embodiment of this application.
Figures 1, 12B:
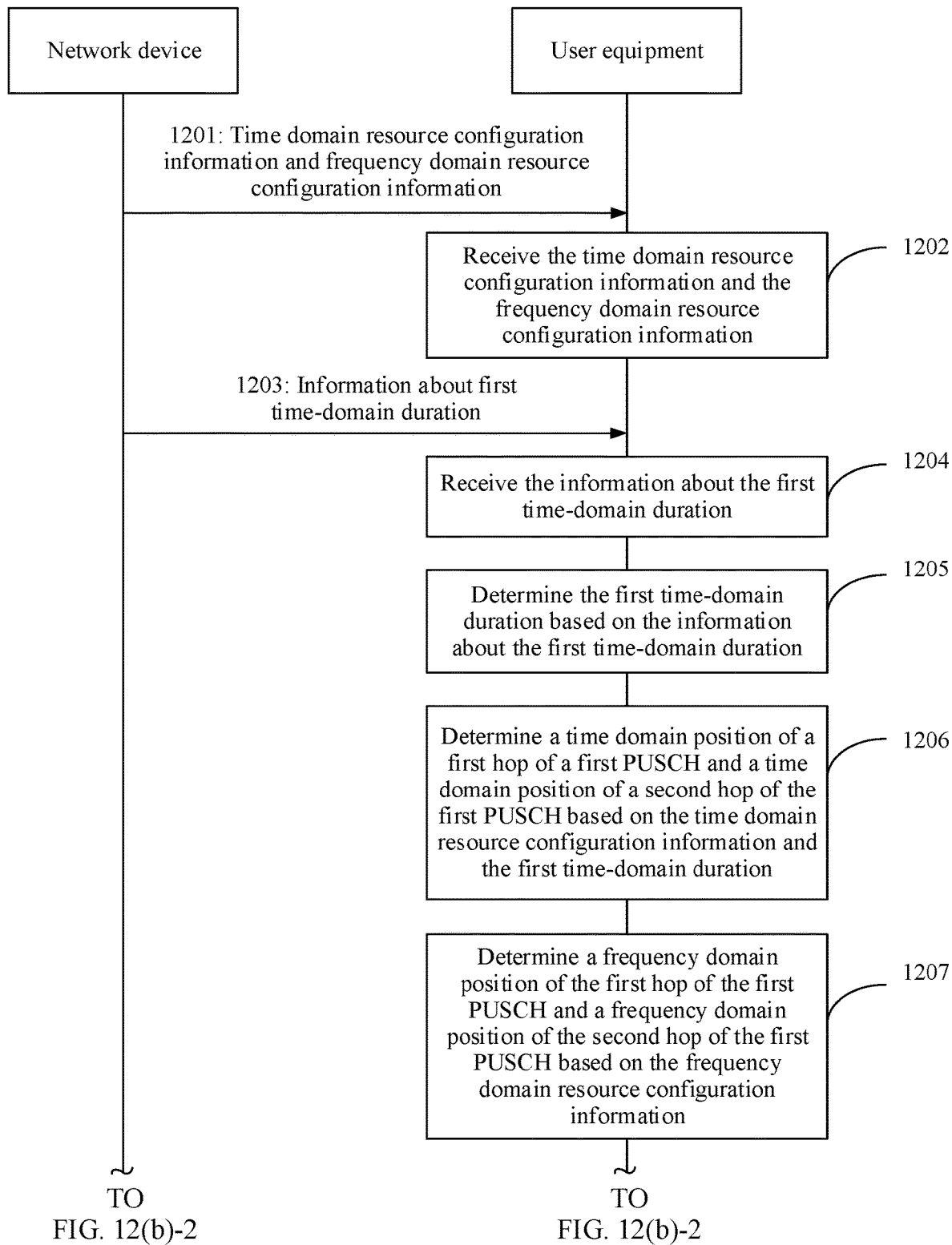
Figures 2, 12B:
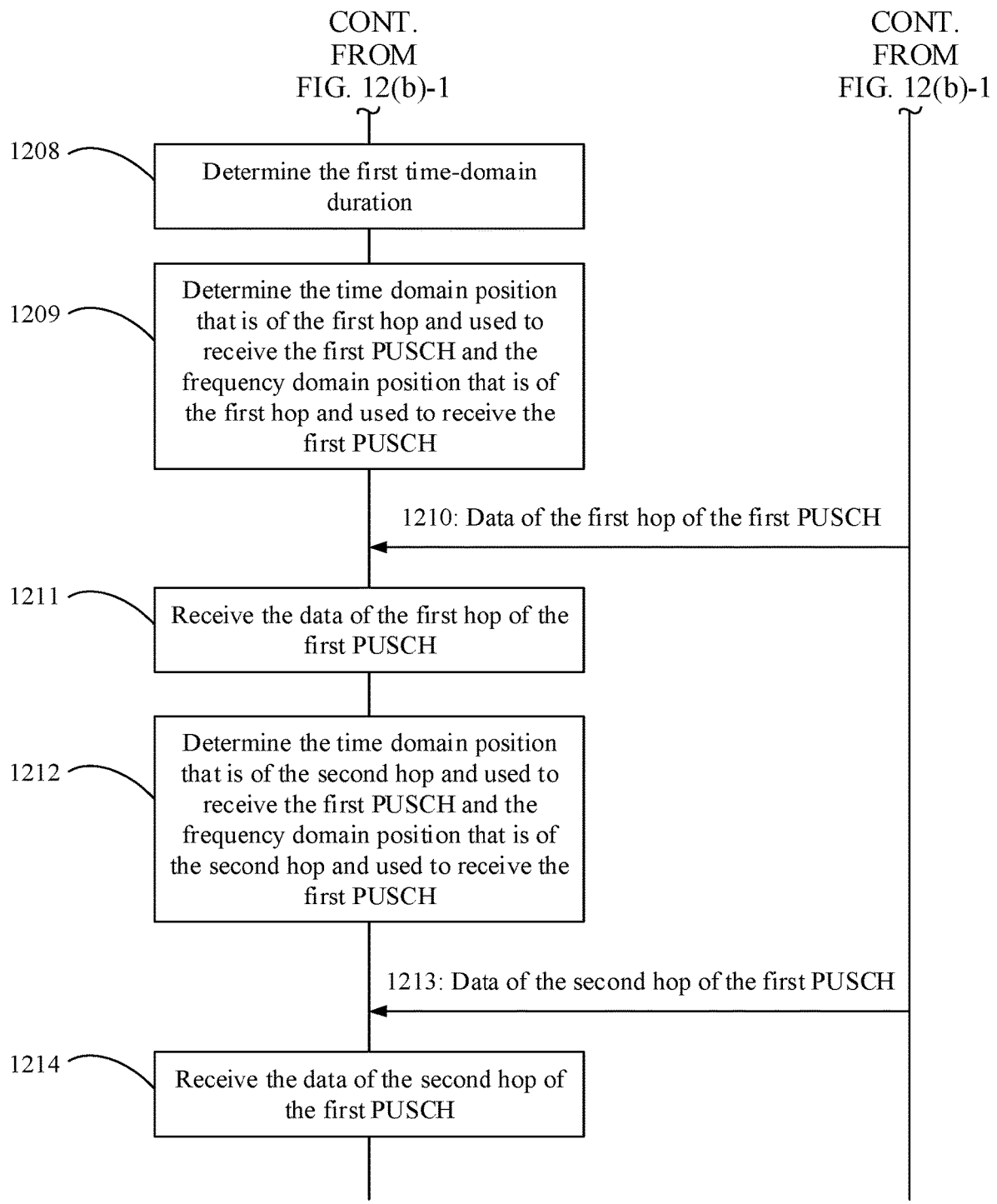

FIG. 12(*a*) shows a method for determining a resource of an asynchronous PUSCH according to an embodiment of this application. The method may include step 1201 to step 1207.

Step 1201: A network device sends time domain resource configuration information and frequency domain resource configuration information to user equipment.

Step 1202: The user equipment receives the time domain resource configuration information and the frequency domain resource configuration information from the network device.

For specific processes of step 1201 and step 1202, refer to corresponding descriptions of step 801 and step 802. Details are not described herein again.

Step 1203: The network device sends information about first time-domain duration to the user equipment.

The information about the first time-domain duration may include the first time-domain duration. For example, when the first time-domain duration is two symbols, the information about the first time-domain duration may be 2. Alternatively, the information about the first time-domain duration may include information used to determine the first time-domain duration. For example, the information about the first time-domain duration may include a time-domain end position of a first hop of a first PUSCH and a time-domain start position of a second hop of the first PUSCH, so that the user equipment determines the first time-domain duration based on the time-domain end position of the first hop of the first PUSCH and the time-domain start position of the second hop of the first PUSCH.

Step 1204: The user equipment receives the information about the first time-domain duration from the network device.

Step 1205: The user equipment determines the first time-domain duration based on the information about the first time-domain duration.

Optionally, if the information about the first time-domain duration includes the first time-domain duration, the user equipment directly determines the first time-domain duration.

Optionally, if the information about the first time-domain duration includes the information used to determine the first time-domain duration, the user equipment determines the first time-domain duration based on the information used to determine the first time-domain duration.

Step 1206: The user equipment determines a time domain position of the first hop of the first PUSCH and a time domain position of the second hop of the first PUSCH based on the time domain resource configuration information and the first time-domain duration.

Step 1207: The user equipment determines a frequency domain position of the first hop of the first PUSCH and a frequency domain position of the second hop of the first PUSCH based on the frequency domain resource configuration information.

Based on the method shown in FIG. 12(*a*), the network device may send the time domain resource configuration information, the frequency domain resource configuration information, and the first time-domain duration to the user equipment, so that the user equipment determines the time domain position of the first hop of the first PUSCH and the time domain position of the second hop of the first PUSCH based on the time domain resource configuration information and the first time-domain duration, and determines the frequency domain position of the first hop of the first PUSCH and the frequency domain position of the second hop of the first PUSCH based on the frequency domain resource configuration information. Therefore, a problem of inter-symbol interference caused by asynchronous transmission of PUSCHs by different user equipments through intra-slot frequency hopping may be resolved, so that user experience is improved.

Optionally, in a first implementation scenario of the embodiment shown in FIG. 12(*a*), that the time domain position of the first hop of the first PUSCH and the time domain position of the second hop of the first PUSCH are inconsecutive in time domain includes: The time-domain end position of the first hop of the first PUSCH and the time-domain start position of the second hop of the first PUSCH are spaced by the first time-domain duration.

For specific descriptions and beneficial effects of the first implementation scenario of the embodiment shown in FIG. 12(*a*), refer to corresponding descriptions of the first implementation scenario of the embodiment shown in FIG. 8(*a*). Details are not described herein again.

Optionally, in a second implementation scenario of the embodiment shown in FIG. 12(*a*), that the user equipment determines a time domain position of the first hop of the first PUSCH and a time domain position of the second hop of the first PUSCH based on the time domain resource configuration information and the first time-domain duration includes: The user equipment determines that a time-domain start position of the first PUSCH is a time-domain start position of the first hop of the first PUSCH, determines time-domain duration of the first hop of the first PUSCH based on time-domain duration of the first PUSCH, and sums up the time-domain start position of the first PUSCH, the time-domain duration of the first hop of the first PUSCH, and the first time-domain duration, to obtain the time-domain start position of the second hop of the first PUSCH.

For specific descriptions and beneficial effects of the second implementation scenario of the embodiment shown in FIG. 12(*a*), refer to corresponding descriptions of the fifth implementation scenario of the embodiment shown in FIG. 8(*a*). Details are not described herein again.

Optionally, in a third implementation scenario of the embodiment shown in FIG. 12(*a*), the frequency domain resource configuration information further includes configuration information of a frequency domain offset. That the user equipment determines a frequency domain position of the first hop of the first PUSCH and a frequency domain position of the second hop of the first PUSCH based on the frequency domain resource configuration information includes: The user equipment determines a frequency-domain start position of the first hop of the first PUSCH based on the frequency domain resource configuration information of the first PUSCH, and determines a frequency-domain start position of the second hop of the first PUSCH based on the frequency-domain start position of the first hop of the first PUSCH, the frequency domain offset, and a total quantity of resource blocks.

For specific descriptions and beneficial effects of the third implementation scenario of the embodiment shown in FIG. 12(*a*), refer to corresponding descriptions of the sixth implementation scenario of the embodiment shown in FIG. 8(*a*). Details are not described herein again.

Optionally, in a fourth implementation scenario of the embodiment shown in FIG. 12(*a*), a total quantity of resource blocks includes a quantity of resource blocks in an uplink bandwidth part BWP, a total quantity of resource blocks includes a quantity of resource blocks in an uplink bandwidth part BWP in which the first PUSCH is located, a total quantity of resource blocks includes a quantity of resource blocks in an uplink bandwidth part BWP in which a physical random access channel PRACH associated with the first PUSCH is located, a total quantity of resource blocks includes a quantity of resource blocks in a time-frequency resource of a PRACH associated with the first PUSCH, or a total quantity of resource blocks includes a quantity of resource blocks in a time-frequency resource group of a PRACH associated with the first PUSCH.

For specific descriptions and beneficial effects of the fourth implementation scenario of the embodiment shown in FIG. 12(*a*), refer to corresponding descriptions of the seventh implementation scenario of the embodiment shown in FIG. 8(*a*). Details are not described herein again.

Optionally, in a fifth implementation scenario of the embodiment shown in FIG. 12(*a*), as shown in FIG. 12(*b*)-1 and FIG. 12(*b*)-2, the method shown in FIG. 8(*a*) further includes step 1208 to step 1214.

Step 1208: The network device determines the first time-domain duration.

Optionally, the first time-domain duration is determined by the network device based on the information that is about the first time-domain duration and sent to the user equipment.

The information about the first time-domain duration may include the first time-domain duration. For example, when the information about the first time-domain duration is 2, the network device determines that the first time-domain duration is two symbols. Alternatively, the information about the first time-domain duration may include the information used to determine the first time-domain duration. For example, the information about the first time-domain duration may include the time-domain end position of the first hop of the first PUSCH and the time-domain start position of the second hop of the first PUSCH, so that the network device may determine the first time-domain duration based on the time-domain end position of the first hop of the first PUSCH and the time-domain start position of the second hop of the first PUSCH.

Step 1209: The network device determines the time domain position that is of the first hop and used to receive the first PUSCH and the frequency domain position that is of the first hop and used to receive the first PUSCH.

The network device may determine, based on the time domain resource configuration information, the time domain position that is of the first hop and used to receive the first PUSCH, and may determine, based on the frequency domain resource configuration information of the first PUSCH, the frequency domain position that is of the first hop and used to receive the first PUSCH.

Step 1210: The user equipment sends data of the first hop of the first PUSCH to the network device at the determined time domain position of the first hop of the first PUSCH and the determined frequency domain position of the first hop of the first PUSCH.

The data of the first hop of the first PUSCH may be a part of uplink data (for example, a transport block) to be sent by the user equipment.

Step 1211: The network device starts to receive the data of the first hop of the first PUSCH from the user equipment at the determined time domain position that is of the first hop and used to receive the first PUSCH and the determined frequency domain position that is of the first hop and used to receive the first PUSCH.

Step 1212: The network device determines the time domain position that is of the second hop and used to receive the first PUSCH and the frequency domain position that is of the second hop and used to receive the first PUSCH.

The network device may determine, based on the time domain resource configuration information and the first time-domain duration, the time domain position that is of the second hop and used to receive the first PUSCH, and may determine, based on the frequency domain resource configuration information of the first PUSCH, the frequency domain position that is of the second hop and used to receive the first PUSCH.

Step 1213: The user equipment sends data of the second hop of the first PUSCH to the network device at the determined time domain position of the second hop of the first PUSCH and the determined frequency domain position of the second hop of the first PUSCH.

Step 1214: The network device starts to receive the data of the second hop of the first PUSCH from the user equipment at the determined time domain position that is of the second hop and used to receive the first PUSCH and the determined frequency domain position that is of the second hop and used to receive the first PUSCH.

For specific descriptions of step 1209 to step 1214, refer to the descriptions corresponding to step 806 to step 811. Details are not described herein again.

Based on the fifth implementation scenario of the embodiment shown in FIG. 12(*a*), the user equipment may send the data of the first hop of the first PUSCH at the determined time domain position of the first hop of the first PUSCH and the determined frequency domain position of the first hop of the first PUSCH, and send the data of the second hop of the first PUSCH at the determined time domain position of the second hop of the first PUSCH and the determined frequency domain position of the second hop of the first PUSCH. The network device may determine, based on the time domain resource configuration information, the first time-domain duration, and the frequency domain resource configuration information of the first PUSCH, the time domain position that is of the first hop and used to receive the first PUSCH, the frequency domain position that is of the first hop and used to receive the first PUSCH, the time domain position that is of the second hop and used to receive the first PUSCH, and the frequency domain position that is of the second hop and used to receive the first PUSCH, start to receive the data of the first hop of the first PUSCH from the user equipment at the determined time domain position that is of the first hop and used to receive the first PUSCH and the determined frequency domain position that is of the first hop and used to receive the first PUSCH, and start to receive the data of the second hop of the first PUSCH from the user equipment at the determined time domain position that is of the second hop and used to receive the first PUSCH and the determined frequency domain position that is of the second hop and used to receive the first PUSCH.

The foregoing mainly describes the solutions provided in the embodiments of this application from a perspective of interaction between the network elements. It may be understood that to implement the foregoing functions, the foregoing terminal device, network device, or the like includes a corresponding hardware structure and/or software module for performing each function. A person skilled in the art should easily be aware that, in combination with the units and algorithm operations in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules of the user equipment or the network device may be divided based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that module division in the embodiments of this application is an example, and is merely a logical function division. During actual implementation, another division manner may be used.

Figure 13:
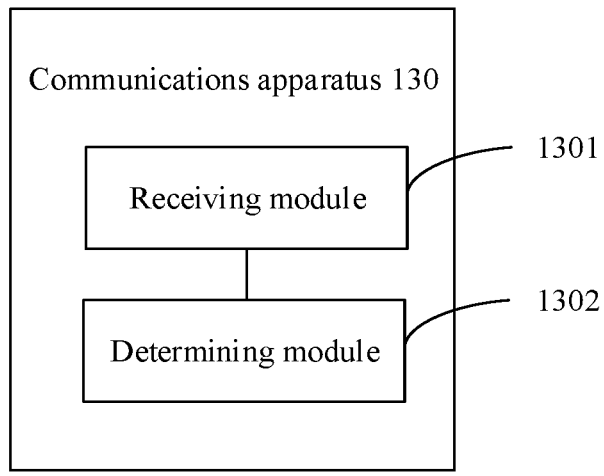
FIG. 13 is a schematic structural diagram 1 of a communications apparatus according to an embodiment of this application.

For example, if the functional modules are divided through integration, FIG. 13 is a schematic structural diagram of a communications apparatus 130. The communications apparatus 130 may be user equipment or a functional module, a chip, or the like that is in user equipment and that can perform the method performed by the user equipment in this application. The communications apparatus 130 includes a receiving module 1301 and a determining module 1302.

The receiving module 1301 is configured to receive time domain resource configuration information and frequency domain resource configuration information from a network device. The time domain resource configuration information includes time domain resource configuration information of a first PUSCH, and the frequency domain resource configuration information includes frequency domain resource configuration information of the first PUSCH. A time domain resource of the first PUSCH is located in one slot, and a frequency-domain frequency hopping type of the first PUSCH is intra-slot frequency hopping.

The determining module 1302 is configured to determine a time domain position of a first hop of the first PUSCH and a time domain position of a second hop of the first PUSCH based on the time domain resource configuration information. The time domain position of the first hop of the first PUSCH and the time domain position of the second hop of the first PUSCH are inconsecutive in time domain.

The determining module 1302 is further configured to determine a frequency domain position of the first hop of the first PUSCH and a frequency domain position of the second hop of the first PUSCH based on the frequency domain resource configuration information of the first PUSCH. A frequency domain resource occupied by the first hop of the first PUSCH is different from a frequency domain resource occupied by the second hop of the first PUSCH.

Optionally, that the time domain position of the first hop of the first PUSCH and the time domain position of the second hop of the first PUSCH are inconsecutive in time domain includes: A time-domain end position of the first hop of the first PUSCH and a time-domain start position of the second hop of the first PUSCH are spaced by first time-domain duration.

Optionally, the first time-domain duration is predefined time-domain duration; the first time-domain duration is determined by the user equipment based on received information about the first time-domain duration; the first time-domain duration is determined by the user equipment based on received information about second time-domain duration, where the second time-domain duration is an interval between a time-domain end position of the first PUSCH and a time-domain start position of a second PUSCH, and a time-frequency resource of the second PUSCH is located after a time-frequency resource of the first PUSCH; or the first time-domain duration is determined by the user equipment based on the time domain resource configuration information.

Optionally, the time domain resource configuration information of the first PUSCH includes information used to determine a time-domain start position of the first PUSCH and information used to determine time-domain duration of the first PUSCH; and that the first time-domain duration is determined by the user equipment based on the time domain resource configuration information includes: When the time-frequency resource of the second PUSCH that is located after the time-frequency resource of the first PUSCH does not exist in the slot, the user equipment determines the first time-domain duration based on a total quantity of symbols in the slot, the time-domain start position of the first PUSCH, and the time-domain duration of the first PUSCH.

Optionally, the time domain resource configuration information of the first PUSCH includes information used to determine a time-domain start position of the first PUSCH and information used to determine time-domain duration of the first PUSCH; and that the first time-domain duration is determined by the user equipment based on the time domain resource configuration information includes: When the time-frequency resource of the second PUSCH that is located after the time-frequency resource of the first PUSCH exists in the slot, the user equipment determines the first time-domain duration based on the time-domain start position of the second PUSCH, the time-domain start position of the first PUSCH, and the time-domain duration of the first PUSCH.

Optionally, the frequency domain resource configuration information further includes configuration information of a frequency domain offset. The determining module 1302 is specifically configured to determine a frequency-domain start position of the first hop of the first PUSCH based on the frequency domain resource configuration information of the first PUSCH. The determining module 1302 is further specifically configured to determine a frequency-domain start position of the second hop of the first PUSCH based on the frequency-domain start position of the first hop of the first PUSCH, the frequency domain offset, and a total quantity of resource blocks.

Optionally, the total quantity of resource blocks includes a quantity of resource blocks in an uplink bandwidth part BWP; the total quantity of resource blocks includes a quantity of resource blocks in an uplink BWP in which the first PUSCH is located; the total quantity of resource blocks includes a quantity of resource blocks in an uplink BWP in which a physical random access channel PRACH associated with the first PUSCH is located; the total quantity of resource blocks includes a quantity of resource blocks in a time-frequency resource of a PRACH associated with the first PUSCH; or the total quantity of resource blocks includes a quantity of resource blocks in a time-frequency resource group of a PRACH associated with the first PUSCH.

All related content of the operations in the foregoing method embodiments may be cited in function descriptions of a corresponding functional module, and details are not described herein again.

In this embodiment, the communications apparatus 130 is presented in a form of functional modules obtained through integration. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communications apparatus 130 may be in the form shown in FIG. 7.

For example, the processor 701 in FIG. 7 may invoke a computer-executable instruction stored in the memory 704, to enable the communications apparatus 130 to perform the method for determining a resource of an asynchronous physical uplink shared channel in the foregoing method embodiments.

For example, functions/implementation processes of the receiving module 1301 and the determining module 1302 in FIG. 13 may be implemented by the processor 701 in FIG. 7 by invoking the computer-executable instruction stored in the memory 704. Alternatively, a function/an implementation process of the determining module 1302 in FIG. 13 may be implemented by the processor 701 in FIG. 7 by invoking the computer-executable instruction stored in the memory 704, and a function/an implementation process of the receiving module 1301 in FIG. 13 may be implemented through the communications interface 703 in FIG. 7.

The communications apparatus 130 provided in this embodiment may perform the foregoing methods for determining a resource of an asynchronous physical uplink shared channel. Therefore, for technical effects that can be obtained by the communications apparatus 130, refer to the foregoing method embodiments. Details are not described herein again.

Figure 14:
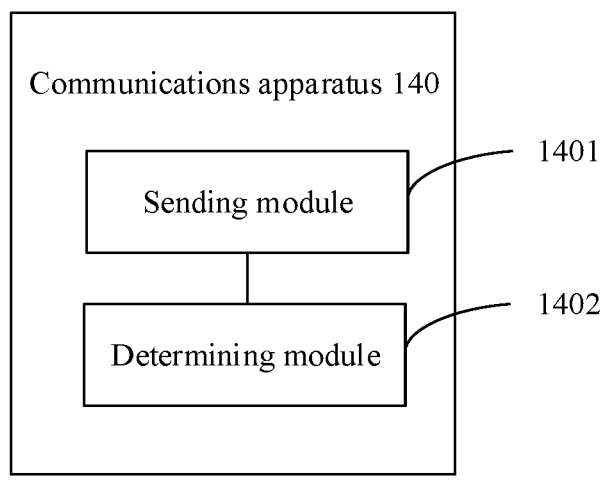
FIG. 14 is a schematic structural diagram 2 of a communications apparatus according to an embodiment of this application.

For example, if the functional modules are divided through integration, FIG. 14 is a schematic structural diagram of a communications apparatus 140. The communications apparatus 140 may be a network device or a functional module, a chip, or the like that is in a network device and that can perform the method performed by the network device in this application. The communications apparatus 140 includes a sending module 1401 and a determining module 1402.

The sending module 1401 is configured to send time domain resource configuration information and frequency domain resource configuration information. The time domain resource configuration information includes time domain resource configuration information of a first PUSCH, and the frequency domain resource configuration information includes frequency domain resource configuration information of the first PUSCH. A time domain resource of the first PUSCH is located in one slot, and a frequency-domain frequency hopping type of the first PUSCH is intra-slot frequency hopping. The determining module 1402 is configured to determine, based on the time domain resource configuration information, a time domain position that is of a first hop and used to receive the first PUSCH and a time domain position that is of a second hop and used to receive the first PUSCH. The time domain position that is of the first hop and used to receive the first PUSCH and the time domain position that is of the second hop and used to receive the first PUSCH are inconsecutive in time domain. The determining module 1402 is further configured to determine, based on the frequency domain resource configuration information of the first PUSCH, a frequency domain position that is of the first hop and used to receive the first PUSCH and a frequency domain position that is of the second hop and used to receive the first PUSCH. A frequency domain resource that is occupied by the first hop and used to receive the first PUSCH is different from a frequency domain resource that is occupied by the second hop and used to receive the first PUSCH.

Optionally, that the time domain position that is of the first hop and used to receive the first PUSCH and the time domain position that is of the second hop and used to receive the first PUSCH are inconsecutive in time domain includes: A time-domain end position that is of the first hop and used to receive the first PUSCH and a time-domain start position that is of the second hop and used to receive the first PUSCH are spaced by first time-domain duration.

Optionally, the first time-domain duration is predefined time-domain duration; the first time-domain duration is determined by the network device based on information that is about the first time-domain duration and sent to the user equipment; the first time-domain duration is determined by the network device based on information that is about second time-domain duration and sent to the user equipment, where the second time-domain duration is an interval between a time-domain end position of the first PUSCH and a time-domain start position of a second PUSCH, and a time-frequency resource of the second PUSCH is located after a time-frequency resource of the first PUSCH; or the first time-domain duration is determined by the network device based on the time domain resource configuration information sent to the user equipment.

Optionally, the time domain resource configuration information of the first PUSCH includes information used to determine a time-domain start position of the first PUSCH and information used to determine time-domain duration of the first PUSCH; and that the first time-domain duration is determined by the network device based on the time domain resource configuration information sent to the user equipment includes: When the time-frequency resource of the second PUSCH that is located after the time-frequency resource of the first PUSCH does not exist in the slot, the user equipment determines the first time-domain duration based on a total quantity of symbols in the slot, the time-domain start position of the first PUSCH, and the time-domain duration of the first PUSCH.

Optionally, the time domain resource configuration information of the first PUSCH includes information used to determine a time-domain start position of the first PUSCH and information used to determine time-domain duration of the first PUSCH; and that the first time-domain duration is determined by the network device based on the time domain resource configuration information sent to the user equipment includes: When the time-frequency resource of the second PUSCH that is located after the time-frequency resource of the first PUSCH exists in the slot, the user equipment determines the first time-domain duration based on the time-domain start position of the second PUSCH, the time-domain start position of the first PUSCH, and the time-domain duration of the first PUSCH.

Optionally, the frequency domain resource configuration information further includes configuration information of a frequency domain offset. The determining module 1402 is specifically configured to determine, based on the frequency domain resource configuration information of the first PUSCH, a frequency-domain start position that is of the first hop and used to receive the first PUSCH. The determining module 1402 is further specifically configured to determine, based on the frequency-domain start position that is of the first hop and used to receive the first PUSCH, the frequency domain offset, and a total quantity of resource blocks, a frequency-domain start position that is of the second hop and used to receive the first PUSCH.

Optionally, the total quantity of resource blocks includes a quantity of resource blocks in an uplink bandwidth part BWP; the total quantity of resource blocks includes a quantity of resource blocks in a time-frequency resource of a physical random access channel PRACH associated with the first PUSCH; or the total quantity of resource blocks includes a quantity of resource blocks in a time-frequency resource group of a PRACH associated with the first PUSCH.

Optionally, the sending module 1401 is further configured to send the information about the first time-domain duration to the user equipment.

All related content of the operations in the foregoing method embodiments may be cited in function descriptions of a corresponding functional module, and details are not described herein again.

In this embodiment, the communications apparatus 140 is presented in a form of functional modules obtained through integration. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communications apparatus 140 may be in the form shown in FIG. 7.

For example, the processor 701 in FIG. 7 may invoke a computer-executable instruction stored in the memory 704, to enable the communications apparatus 140 to perform the method for determining a resource of an asynchronous physical uplink shared channel in the foregoing method embodiments.

For example, functions/implementation processes of the sending module 1401 and the determining module 1402 in FIG. 14 may be implemented by the processor 701 in FIG. 7 by invoking the computer-executable instruction stored in the memory 704. Alternatively, a function/an implementation process of the determining module 1402 in FIG. 14 may be implemented by the processor 701 in FIG. 7 by invoking the computer-executable instruction stored in the memory 704, and a function/an implementation process of the sending module 1401 in FIG. 14 may be implemented through the communications interface 703 in FIG. 7.

The communications apparatus 140 provided in this embodiment may perform the foregoing methods for determining a resource of an asynchronous physical uplink shared channel. Therefore, for technical effects that can be obtained by the communications apparatus 140, refer to the foregoing method embodiments. Details are not described herein again.

Figure 15:
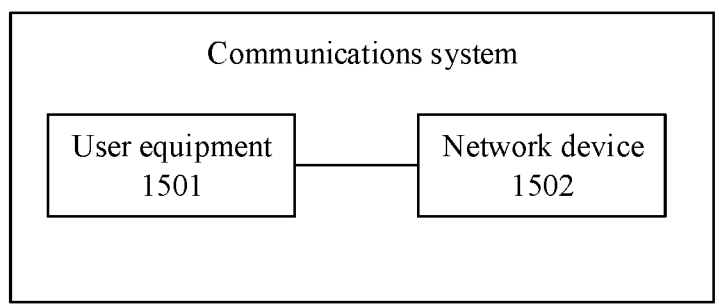
FIG. 15 is a schematic structural diagram of a communications system according to an embodiment of this application.

FIG. 15 is a schematic composition diagram of a communications system. As shown in FIG. 15, the communications system may include user equipment 1501 and a network device 1502. It should be noted that FIG. 15 is merely an accompanying drawing of an example, and network elements included in the communications system shown in FIG. 15 and a quantity of the network elements are not limited in this embodiment of this application.

The user equipment 1501 has a function of the communications apparatus 130 shown in FIG. 13, and may be configured to: receive time domain resource configuration information and frequency domain resource configuration information sent by the network device 1502, determine, based on the time domain resource configuration information, a time domain position of a first hop of a first PUSCH and a time domain position of a second hop of the first PUSCH, and determine, based on the frequency domain resource configuration information of the first PUSCH, a frequency domain position of the first hop of the first PUSCH and a frequency domain position of the second hop of the first PUSCH.

The network device 1502 has a function of the communications apparatus 140 shown in FIG. 14, and is configured to: send the time domain resource configuration information and the frequency domain resource configuration information to the user equipment 1501, determine, based on the time domain resource configuration information, the time domain position that is of the first hop and used to receive the first PUSCH and the time domain position that is of the second hop and used to receive the first PUSCH, and determine, based on the frequency domain resource configuration information of the first PUSCH, the frequency domain position that is of the first hop and used to receive the first PUSCH and a frequency domain resource that is of the second hop and used to receive the first PUSCH.

It should be noted that all related content of the steps in the foregoing method embodiments may be cited in function descriptions of corresponding network elements of the communications system. Details are not described herein again.

Based on the method shown in FIG. 15, when the user equipment 1501 does not perform uplink synchronization and uses a frequency-domain frequency hopping type of intra-slot frequency hopping, the time domain position of the first hop of the first PUSCH and the time domain position of the second hop of the first PUSCH are enabled to be inconsecutive in time domain, to avoid inter-symbol interference caused by asynchronous transmission by different user equipments, so that user experience is improved.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and accompanying drawings are merely descriptions of examples of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application, provided that they fall within the scope of protection defined by the following claims and their equivalent technologies in this application.

What is claimed is:

1. A method performed by user equipment for determining a resource of an asynchronous physical uplink shared channel (PUSCH), comprising:
receiving time domain resource configuration information and frequency domain resource configuration information from a network device, wherein the time domain resource configuration information comprises time domain resource configuration information of a first PUSCH, the frequency domain resource configuration information comprises frequency domain resource configuration information of the first PUSCH, a time domain resource of the first PUSCH is located in one slot in a time domain, and a frequency-domain frequency hopping type of the first PUSCH is intra-slot frequency hopping;
determining a time domain position of a first hop of the first PUSCH and a time domain position of a second hop of the first PUSCH based on the time domain resource configuration information, wherein the time domain position of the first hop of the first PUSCH and the time domain position of the second hop of the first PUSCH are inconsecutive in time domain; and
determining a frequency domain position of the first hop of the first PUSCH and a frequency domain position of the second hop of the first PUSCH based on the frequency domain resource configuration information of the first PUSCH, wherein a frequency domain resource occupied by the first hop of the first PUSCH is different from a frequency domain resource occupied by the second hop of the first PUSCH.

2. The method according to claim 1, wherein a time-domain end position of the first hop of the first PUSCH and a time-domain start position of the second hop of the first PUSCH are spaced by a first time-domain duration.

3. The method according to claim 2, further comprising:
obtaining the first time-domain duration as a predefined time-domain duration;
determining the first time-domain duration based on received information about the first time-domain duration;
determining the first time-domain duration based on received information about a second time-domain duration, wherein the second time-domain duration is an interval between a time-domain end position of the first PUSCH and a time-domain start position of a second PUSCH, and a time-frequency resource of the second PUSCH is located after a time-frequency resource of the first PUSCH; or
determining the first time-domain duration based on the time domain resource configuration information.

4. The method according to claim 3, wherein the time domain resource configuration information of the first PUSCH comprises information for determining a time-domain start position of the first PUSCH and information for determining time-domain duration of the first PUSCH, and wherein the step of determining the first time-domain duration comprises:
when the time-frequency resource of the second PUSCH that is located after the time-frequency resource of the first PUSCH does not exist in the slot, determining the first time-domain duration based on a total quantity of symbols in the slot, the time-domain start position of the first PUSCH, and the time-domain duration of the first PUSCH.

5. The method according to claim 3, wherein the time domain resource configuration information of the first PUSCH comprises information for determining a time-domain start position of the first PUSCH and information for determining time-domain duration of the first PUSCH, and wherein the step of determining the first time-domain duration based on the time domain resource configuration information comprises:
when the time-frequency resource of the second PUSCH that is located after the time-frequency resource of the first PUSCH exists in the slot, determining the first time-domain duration based on the time-domain start position of the second PUSCH, the time-domain start position of the first PUSCH, and the time-domain duration of the first PUSCH.

6. The method according to claim 1, further comprising:
receiving frequency-domain frequency hopping configuration information, wherein the frequency-domain frequency hopping configuration information is for determining that the frequency-domain frequency hopping type of the first PUSCH is intra-slot frequency hopping.

7. The method according to claim 1, wherein the frequency domain resource configuration information further comprises configuration information of a frequency domain offset, and the step of determining the frequency domain position of the first hop of the first PUSCH and the frequency domain position of the second hop of the first PUSCH comprises:
determining a frequency-domain start position of the first hop of the first PUSCH based on the frequency domain resource configuration information of the first PUSCH; and
determining a frequency-domain start position of the second hop of the first PUSCH based on the frequency-domain start position of the first hop of the first PUSCH, the frequency domain offset, and a total quantity of resource blocks.

8. The method according to claim 7, wherein the configuration information of the frequency domain offset comprises information is for determining the frequency domain offset, and the method further comprises:
determining the frequency domain offset based on a correspondence among the total quantity of resource blocks, the information for determining the frequency domain offset, and the frequency domain offset.

9. The method according to claim 7, wherein the total quantity of resource blocks comprises a quantity of resource blocks in an uplink bandwidth part BWP;
the total quantity of resource blocks comprises a quantity of resource blocks in a time-frequency resource of a physical random access channel PRACH associated with the first PUSCH; or
the total quantity of resource blocks comprises a quantity of resource blocks in a time-frequency resource group of a PRACH associated with the first PUSCH.

10. User equipment comprising:
a memory storing executable instructions; and
a processor configured to execute the executable instructions to:
receive time domain resource configuration information and frequency domain resource configuration information from a network device, wherein the time domain resource configuration information comprises time domain resource configuration information of a first PUSCH, the frequency domain resource configuration information comprises frequency domain resource configuration information of the first PUSCH, a time domain resource of the first PUSCH is located in one slot in a time domain, and a frequency-domain frequency hopping type of the first PUSCH is intra-slot frequency hopping;
determine a time domain position of a first hop of the first PUSCH and a time domain position of a second hop of the first PUSCH based on the time domain resource configuration information, wherein the time domain position of the first hop of the first PUSCH and the time domain position of the second hop of the first PUSCH are inconsecutive in time domain;
determine a frequency domain position of the first hop of the first PUSCH and a frequency domain position of the second hop of the first PUSCH based on the frequency domain resource configuration information of the first PUSCH, wherein a frequency domain resource occupied by the first hop of the first PUSCH is different from a frequency domain resource occupied by the second hop of the first PUSCH.

11. The user equipment according to claim 10, wherein that the time domain position of the first hop of the first PUSCH and the time domain position of the second hop of the first PUSCH are inconsecutive in time domain in that a time-domain end position of the first hop of the first PUSCH and a time-domain start position of the second hop of the first PUSCH are spaced by first time-domain duration.

12. The user equipment according to claim 11, wherein the processor is configured to:
   obtain the first time-domain duration as a predefined time-domain duration;
   determine the first time-domain duration based on received information about the first time-domain duration;
   determine the first time-domain duration based on received information about second time-domain duration, wherein the second time-domain duration is an interval between a time-domain end position of the first PUSCH and a time-domain start position of a second PUSCH, and a time-frequency resource of the second PUSCH is located after a time-frequency resource of the first PUSCH; or
   determine the first time-domain duration based on the time domain resource configuration information.

13. The user equipment according to claim 12, wherein the time domain resource configuration information of the first PUSCH comprises information for determining a time-domain start position of the first PUSCH and information for determining time-domain duration of the first PUSCH, and wherein the processor is configured to determine the first time-domain duration based on the time domain resource configuration information by:
   when the time-frequency resource of the second PUSCH that is located after the time-frequency resource of the first PUSCH does not exist in the slot, determining the first time-domain duration based on a total quantity of symbols in the slot, the time-domain start position of the first PUSCH, and the time-domain duration of the first PUSCH.

14. The user equipment according to claim 12, wherein the time domain resource configuration information of the first PUSCH comprises information for determining a time-domain start position of the first PUSCH and information for determining time-domain duration of the first PUSCH, and wherein the processor is configured to determine the first time-domain duration based on the time domain resource configuration information by:
   when the time-frequency resource of the second PUSCH that is located after the time-frequency resource of the first PUSCH exists in the slot, determining the first time-domain duration based on the time-domain start position of the second PUSCH, the time-domain start position of the first PUSCH, and the time-domain duration of the first PUSCH.

15. The user equipment according to claim 10, wherein the processor is further configured to receive frequency-domain frequency hopping configuration information, wherein the frequency-domain frequency hopping configuration information is for determining that the frequency-domain frequency hopping type of the first PUSCH is intra-slot frequency hopping.

16. The user equipment according to claim 10, wherein the frequency domain resource configuration information further comprises configuration information of a frequency domain offset, and wherein the processor is configured to:
   determine a frequency-domain start position of the first hop of the first PUSCH based on the frequency domain resource configuration information of the first PUSCH; and
   determine a frequency-domain start position of the second hop of the first PUSCH based on the frequency-domain start position of the first hop of the first PUSCH, the frequency domain offset, and a total quantity of resource blocks.

17. The user equipment according to claim 16, wherein the configuration information of the frequency domain offset comprises information for determining the frequency domain offset, and wherein the processor is further configured to determine the frequency domain offset based on a correspondence among the total quantity of resource blocks, the information for determining the frequency domain offset, and the frequency domain offset.

18. The user equipment according to claim 16, wherein
   the total quantity of resource blocks comprises a quantity of resource blocks in an active uplink bandwidth part BWP;
   the total quantity of resource blocks comprises a quantity of resource blocks in a time-frequency resource of a physical random access channel PRACH associated with the first PUSCH; or
   the total quantity of resource blocks comprises a quantity of resource blocks in a time-frequency resource group of a PRACH associated with the first PUSCH.

19. A computer-readable storage medium having stored thereon executable instructions, wherein the executable instructions when executed by a processor of user equipment cause the user equipment to perform operations of:
   receiving time domain resource configuration information and frequency domain resource configuration information from a network device, wherein the time domain resource configuration information comprises time domain resource configuration information of a first PUSCH, the frequency domain resource configuration information comprises frequency domain resource configuration information of the first PUSCH, a time domain resource of the first PUSCH is located in one slot in a time domain, and a frequency-domain frequency hopping type of the first PUSCH is intra-slot frequency hopping;
   determining a time domain position of a first hop of the first PUSCH and a time domain position of a second hop of the first PUSCH based on the time domain resource configuration information, wherein the time domain position of the first hop of the first PUSCH and the time domain position of the second hop of the first PUSCH are inconsecutive in time domain; and
   determining a frequency domain position of the first hop of the first PUSCH and a frequency domain position of the second hop of the first PUSCH based on the frequency domain resource configuration information of the first PUSCH, wherein a frequency domain resource occupied by the first hop of the first PUSCH is different from a frequency domain resource occupied by the second hop of the first PUSCH.

* * * * *